METALLURGICAL MELTING AND REFINING PROCESS

Original Filed April 5, 1961 7 Sheets-Sheet 1

INVENTOR.
EDWARD F. KURZINSKI
BY Shanley & O'Neil
ATTORNEYS

METALLURGICAL MELTING AND REFINING PROCESS

Original Filed April 5, 1961 7 Sheets-Sheet 2

INVENTOR.
EDWARD F. KURZINSKI
BY Shanley & O'Neil
ATTORNEYS

March 12, 1968 E. F. KURZINSKI Re. 26,364

METALLURGICAL MELTING AND REFINING PROCESS

Original Filed April 5, 1961

7 Sheets-Sheet 3

INVENTOR.
EDWARD F. KURZINSKI
BY Shanley & O'Neil
ATTORNEYS

METALLURGICAL MELTING AND REFINING PROCESS

Original Filed April 5, 1961 7 Sheets-Sheet 4

INVENTOR.
EDWARD F. KURZINSKI
BY Shanley & O'Neil
ATTORNEYS

METALLURGICAL MELTING AND REFINING PROCESS

Original Filed April 5, 1961 7 Sheets-Sheet 5

INVENTOR.
EDWARD F. KURZINSKI
BY Shanley & O'Neil
ATTORNEYS

March 12, 1968 E. F. KURZINSKI Re. 26,364

METALLURGICAL MELTING AND REFINING PROCESS

Original Filed April 5, 1961 7 Sheets-Sheet 6

INVENTOR.
EDWARD F. KURZINSKI
BY Stanley & O'Neil
ATTORNEYS

METALLURGICAL MELTING AND REFINING PROCESS

Original Filed April 5, 1961 7 Sheets-Sheet 7

INVENTOR.
EDWARD F. KURZINSKI
BY Shanley & O'Neil
ATTORNEYS

United States Patent Office

Re. 26,364
Reissued Mar. 12, 1968

26,364

METALLURGICAL MELTING AND REFINING PROCESS

Edward F. Kurzinski, Doylestown, Pa., assignor, by mesne assignments, to Air Products and Chemicals, Inc., Trexlertown, Pa., a corporation of Delaware Original No. 3,194,650, dated July 13, 1965, Ser. No. 101,022, Apr. 5, 1961, which is a continuation-in-part of Ser. No. 7,457, Feb. 8, 1960. Application for reissue June 21, 1966, Ser. No. 562,976
27 Claims. (Cl. 75—43)

Matter enclosed in heavy brackets [ ] appears in the original patent but forms no part of this reissue specification; matter printed in italics indicates the additions made by reissue.

This application is a continuation-in-part of applicant's copending application S.N. 7,457, filed February 8, 1960 (and now abandoned), for "Metallurgical Process and Apparatus," which application is a continuation-in-part of application S.N. 804,809, filed April 7, 1959, for "Steel Making Process," now abandoned.

The present invention relates to improvements in metallurgical process and apparatus and more particularly to novel methods and apparatus for producing metals in furnaces of the type in which material is placed in a furnace and heat is applied to the material by a flame which impinges on the material.

The production of metals in furnaces of this type requires, among other things, controlled application of heat to the furnace including rapid application of the greatest permissible quantity of heat to the material while maintaining a proper atmosphere within the furnace during various stages of a heat, such as the melt-down period, the period of hot metal addition and the working or refining period.

The present invention is applicable to a variety of furnaces for the production of a variety of non-ferruginous metals. Problems overcome by the present invention, however, can for the most part be illustrated by reference to the production of steel in an open hearth furnace, it being expressly understood that this is only one of the many examples that could be cited. In a conventional open hearth furnace, heat is supplied by combustion of fuel in burners fixed in the end walls of the furnace. The quantity of heat that may be introduced into a furnace in this manner is limited by the roof refractories and by the furnace geometry, the roof refractories being damaged by high temperature and the furnace geometry limiting the amount of air that can be supplied, and thus correspondingly limiting the quantity of fuel that can be burned and the size and shape of the flame. Moreover, a substantial proportion of the heat transfer from the burner flame is by radiation to the material in the hearth. Naturally, the heat from the flame is radiated in all directions from the flame, and only that portion of the environment of the flame which is occupied by the charge is thus heated by the flame; and if the charge is covered with slag, it is the slag and not the charge that receives the heat directly from the flame.

Attempts have been made in the past to increase the transfer rate of heat units to the material in the hearth such as by the use of multiple burners fixed in the end walls or in the roof or by the use of high density fuels. In all such cases, however, an inefficient performance resulted since the fuel input was materially limited by the maximum permissible roof temperature, since there was inefficient heat interchange between the burner flames and the material in the hearth, and since the heat insulation characteristics of the slag interfered with heat transfer to the charge.

Comparable difficulties have been encountered in other types of pyrometallurgical apparatus and processes of the general types recited above.

Accordingly, it is an object of the present invention to provide novel methods of and apparatus for improving the efficiency of heat transfer to material comprising the charge of a metallurgical furnace.

Another object of the present invention is the provision of a novel method of and apparatus for transferring heat to material in a metallurgical furnace in such a manner as to permit an increase in the fuel input to the furnace without damage to the furnace.

Still another object is to provide a novel method of and apparatus for operating open hearth furnaces which results in a drastic reduction in the time for a heat as compared to the heat time required when practicing conventional methods.

During stages of a pyrometallurgical process in which the charge is exposed to flames, it may be necessary, due to normal or abnormal conditions, periodically to vary the heat units supplied to the material under treatment. For example, during hot metal addition, a foaming slag may form which further decreases the heat conductivity between the flame and the bath and as a result the bath becomes cold and sluggish. This condition presents a serious problem in conventional furnace operation and it is necessary to decrease the fuel input to the furnace in order to maintain the temperature of the lining within safe limits, thereby slowing down the process until a normal slag is obtained. Also, control of heat to the bath is required during the working or refining stage if metallic ores are added to the bath to supply oxygen to the reaction, since the addition of ores reduces the bath temperature at a time when the bath must be at a temperature sufficient to prevent freezing upon addition of the oxidizing agents and also to promote the endothermic oxidizing reactions involving the metallic ores. Also, difficulties resulting in time-consuming operations are also experienced in conventional practice when attempting to obtain and maintain proper bath temperature and furnace atmosphere so as to assure the desired composition of the bath at the time of tapping.

It is therefore a further object of the present invention to provide a novel method of and apparatus for accurately controlling and varying the temperature of a furnace of the type described.

A still further object of the present invention is the provision of novel methods of and apparatus for controlling the atmosphere of a furnace of the type described during various stages of the process.

Further objects and features of the present invention will become apparent from a consideration of the following description, taken in connection with the accompanying drawings, which illustrate several embodiments of the present invention. It is to be understood, however, that the several embodiments of the present invention shown in the accompanying drawings are by no means all the embodiments of which the invention is susceptible.

In the drawings, in which similar reference characters denote similar elements throughout the several views:

FIGURE 3 is a detailed view of a portion of the apparatus shown in FIGURE 1;

In general, the present invention comprises conducting fuel and oxygen within a furnace along at least one confined path to a point in the furnace spaced from the walls of the furnace and in close proximity to material in the furnace and there forming a high temperature high velocity flame which is impinged directly on adjacent material from above and from only a short distance away. During the melting down period, the flame is played on the material within the furnace. When the invention is practiced in connection with a liquid charge, as for example during the refining period following a melting down period, the flame is directed against the charge from a short distance away and the axis of the flame is maintained at an angle greater than 25° with the charge and the flame is given such a velocity as to part any slag that may be on the surface of the liquid charge so that the flames directly contact the molten metal. In any event, this method differs fundamentally from the earlier methods in that heat is transferred from the flame to the charge (*e.g., pig iron*) whether solid or molten, substantially by convection rather than by radiation. In particular, it has been found that the temperature gradient across the flame of the present invention is less than for conventional practice using air, or for that matter less than conventional burner practice employing oxygen with air, so that in effect the proportion of the flame contacting the charge which is at or near the maximum flame temperature will be considerably greater than in conventional practice; while at the same time, the surface area of the flame from which radiation can take place is greatly reduced as compared to conventional practice. As a result, the rate of fuel feed and hence the rate of heat input can be increased, and the total time of the heat can be reduced, compared to conventional practice.

Figure 1:
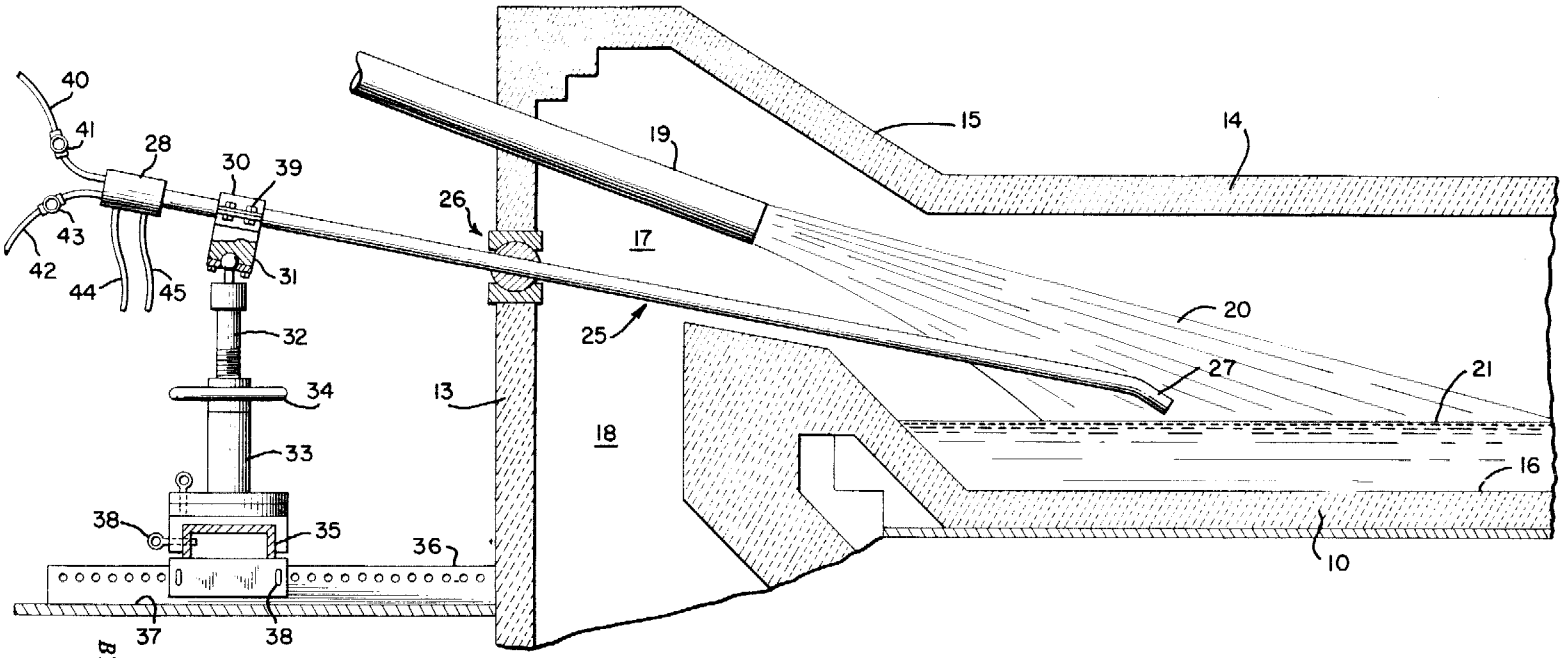
FIGURE 1 is a diagrammatic view, partially in longitudinal section, of one end of an open hearth furnace constructed in accordance with one embodiment of the present invention.
Figure 2:
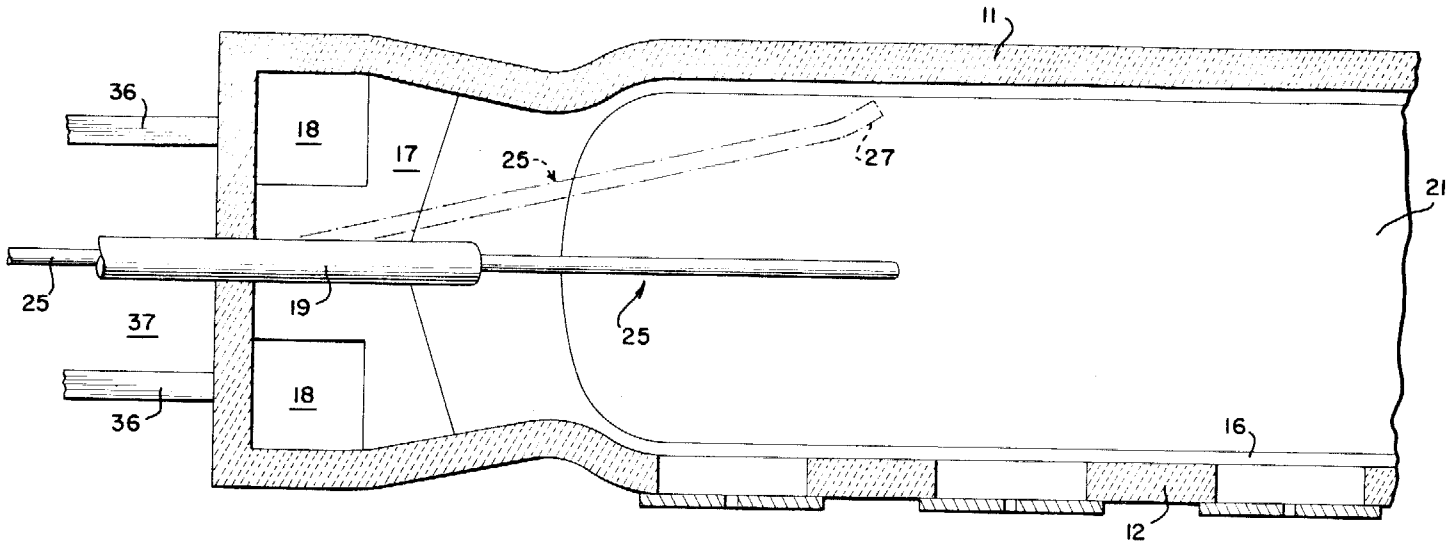
FIGURE 2 is a plan view, partly in section, of the structure shown in FIGURE 1.

Referring now to the drawings in greater detail, one of the many embodiments of the present invention is shown in FIGURES 1, 2 and 3 in the environment of a generally conventional open hearth furnace which has been modified relatively little to adapt it to the practice of the present invention. As is there shown, an open hearth furnace is provided, including a bottom 10, a back wall 11, a front wall 12, an end wall 13, a roof 14 and a roof port 15, illustration of only one end portion of the furnace being necessary for an understanding of the principles of the invention. The bottom 10 provides a hearth 16 in communication with a port 17 which leads through gas passageway 18 to conventional checkers (not shown). A conventional end wall burner 19 mounted in end wall 13 and fed with fuel and steam such as liquid fuel atomized by steam. When burned with air heated in the checkers, the fuel produces a flame 20 which is directed longitudinally of the furnace onto material in the hearth such as a solid charge, or a bath of molten material 21. Burner 19 has the usual means (not shown) for feeding and ejecting combustible fuel mixtures. There is an identical burner at the other end of the furnace (not shown), and the burners are operated in alternation, as is usual. The structure thus far described is conventional.

In order to change the mode of heat transfer and to achieve the objects of the invention, the present invention provides, in connection with this first embodiment, a novel method of and apparatus for introducing fuel and oxygen into the furnace through at least one confined path to a point in the furnace spaced from the roof and walls of the furnace and above the charge, and there forming the fuel and oxygen into a high velocity high temperature flame which is relatively small compared to a conventional burner flame and which is impinged directly onto material in the hearth in close proximity therewith, so that heat is transferred to the charge substantially by convection rather than by radiation. For this purpose, there is provided an elongated jet device 25 positioned in the end wall 13 of the furnace by mounting means 26 which permits universal movement of the jet device including rotation about its longitudinal axis. Jet device 25 is slidable through mounting means 26 and is thus movable along its own axis relative to the furnace. The elongated jet device includes a discharge end 27 located within the furnace and which may be angularly disposed with respect to the longitudinal axis of the jet device, and an input end 28 located outside the furnace. Jet device 25 is disposed below burner 19 and extends into the furnace substantially beyond burner 19 so that the flame from burner 19 masks the flame from jet device 25 from the roof. A similar jet device is located in the opposite end wall of the furnace, beneath the end wall burner in that end wall. The jet devices, like the end wall burners, may be alternately operated in synchronism with the direction of flow of air to and exhaust gases from the furnace Apparatus for universally moving jet device 25 includes a sleeve 30 universally joined as by a ball and socket arrangement 31 to the upper end of a vertically disposed pedestal 32 screw threadedly mounted in a supporting base 33 provided with a movable member 34 operable to establish the height of pedestal 32, the member 34 being shown in the form of a hand wheel for manual adjustment. Supporting base 33 is mounted on transverse track 35 and the transverse track is in turn slidably mounted on a pair of longitudinal tracks 36 supported on floor 37. Base 33 may be moved relative to track 35 and track 35 may be moved relative to tracks 36 by suitable power means (not shown) and these members may be locked in any desired position relative to each other by means of pins 38. With this arrangement, movement of the transverse track relative to the longitudinal tracks will effect inward and outward movement of the discharge end of the jet device relative to the end wall, and movement of base 33 relative to the transverse track will cause the jet device to swing toward the front wall or the back wall of the furnace depending upon the direction of movement of the supporting base. Vertical adjustment of pedestal 32 will effect vertical movement of the discharge end of the jet device relative to the hearth. The device may be rotated about its longitudinal axis to move the discharge end 27 to different angular positions by employing a split sleeve 30 provided with clamping means 39.

Jet device 25 is of the cooled type and includes longitudinal passageways (not shown) extending from inlet end 28 to at least adjacent discharge end 27, for conducting a cooling fluid such as water through inlet conduit 44 to the discharge end 27 and for returning warmed cooling fluid to the inlet end of the device for discharge through outlet conduit 45. In addition, the jet device includes structure defining a pair of conduits, each formed by at least one passageway (not shown) extending from the input end 28 to the discharge end 27. The discharge end of the jet device thus provides means for mixing the fuel and oxygen and for discharging the mixture for combustion in the furnace. One of the passageways is fed with oxygen controllably supplied by conduit 42 having control valve 43 and another confined path receives fuel in gaseous or liquid form supplied through conduit 40 provided with a control valve 41. When liquid fuel is used, gaseous oxygen may be used to atomize the fuel and the atomization may be accomplished in or adjacent the discharge end 27. Whether the fuel is in liquid or gaseous form, the mixing with the oxygen may be performed at or near the discharge end of the jet device or outside the furnace such as at the inlet end 28. In the latter case, the jet device may include but one passageway for feeding the combustible mixture through the jet device to its discharge end. Obviously, however, the combustible mixture is explosive when confined; and hence, well-designed equipment is needed when mixing upstream from the discharge end. Thus, jet device 25 may for example comprise three concentric shells; an inner passageway through which fuel passes, a middle passageway surrounding the inner passageway and through which oxygen passes, and an outer passageway for water, the outer passageway being closed at discharge end 27 and divided longitudinally into two separate passageways except at end 27, so that water must pass down to end 27 and back when traveling from conduit 44 to conduit 45. The inner and middle conduits, of course, are open at end 27.

The embodiment of FIGURES 1, 2 and 3 has the advantage that it is adaptable to existing installations such as present day open hearth furnaces for steel production. In accordance with the principles of the present invention, however, it will be evident that a relatively high proportion of the fuel supplied to the process should be fed through the jet devices rather than through the end wall burners. Nevertheless, there remains a certain advantage in continuing to supply some of the heat requirements of the process by means of the end wall burners rather than entirely through the jet devices, for the relatively low temperature flames from the end wall burners form in effect a canopy over the relatively high temperature flames of the jet device, so that the roof refractories are not subjected even to the relatively small quantity of high temperature radiation which is nevertheless emitted from the high temperature flames notwithstanding the fact that substantially all the heat from these flames is transmitted by convection to the charge. Thus, although the principal source of heat in this embodiment in the present invention is the jet flames, the canopy effect of the end wall burner flames and the resulting transmission to the charge of heat that might otherwise be lost by radiation from the jet flames may often make it economically feasible to continue to operate the end wall burners at reduced rates of fuel consumption.

Figure 4:
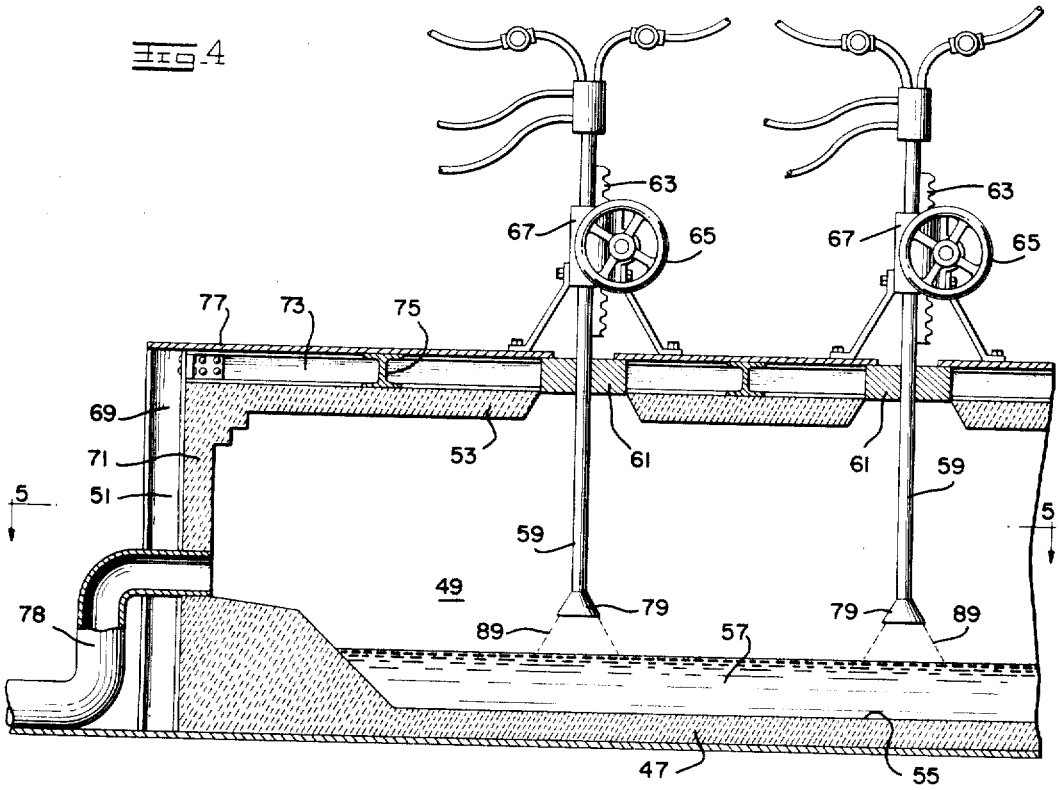
FIGURE 4 is a diagrammatic view, partly in longitudinal section, of an open hearth type of furnace modified in accordance with another embodiment of the present invention.

The concept of the present invention of conducting fuel and oxygen to within a furnace along at least one confined path to a point in the furnace spaced from the walls of the furnace and in close proximity with material in the furnace and there forming a high temperature flame which is impinged directly on the material may, in accordance with another embodiment of the present invention, be employed in conventional open hearth furnaces in a manner different from the embodiment shown in FIGURES 1, 2 and 3 which makes it possible to operate conventional open hearth furnaces according to a novel process providing greatly improved production even though the major portion of the total fuel input of the furnace may be introduced through the conventional end wall burners. In such an embodiment one or a plurality of elongated oxy-fuel burners or jet devices are mounted in the roof of a conventional open hearth furnace with the longitudinal axis of the oxy-fuel burners, substantially vertically disposed by an apparatus which permits vertical adjustment of the discharge ends of the oxy-fuel burners within the furnace. Although FIGURES 4 and 5 of the drawings illustrate a still further embodiment of the invention to be described in detail below, the figures show the manner oxy-fuel burners may be mounted in the roof of a conventional open hearth furnace. The roof 53 of the furnace of FIGURE 4 may be considered as the roof of a conventional open hearth furnace and a plurality of elongated jet device or oxy-fuel burners 59 are mounted through the roof 53 for heightwise adjustment within the furnace. FIGURE 4 illustrates two elongated oxy-fuel burners in one half of the furnace and therefore this drawing shows an arrangement including four oxy-fuel burners mounted in the roof of the furnace. It is to be understood that a greater or lesser number of oxy-fuel burners may be employed if desired. The oxy-fuel burners 59 extend through mounting means 61 in the furnace roof to within the furnace for heightwise movement relative to the furnace roof and means are located without the furnace for adjustable positioning the oxy-fuel burner within the furnace; a rack 63 on the jet device cooperating with a pinion located within stationary sleeve 67 and manipulated by a hand wheel 65 may be provided for the latter purpose. The oxy-fuel burners may include a single axially disposed nozzle at their discharge ends but it is preferable to employ elongated oxy-fuel burners having discharge ends including a plurality of nozzles inclined outwardly from and substantially equally spaced about the longitudinal axis of the burners. The oxy-fuel burners 59, like the jet device 25 of FIGURE 1, are provided with oxygen and fuel passageways which communicate outside the furnace with sources of oxygen and fuel through suitable valved conduits. The passageways extend through the elongated burners and by means of a suitable mixing arrangement a combustible mixture is discharged through the nozzles and burned in short, high intensity flames extending angularly and downwardly from the discharge ends of the oxy-fuel burners. The oxy-fuel burners 59 are also fed with suitable fluid coolant. Oxy-fuel burners disclosed in applicant application Serial No. 101,012, filed concurrently herewith, may be used in connection with the present invention.

In operation of a conventional open hearth furnace modified to include one or more roof-mounted oxy-fuel burners as described above, the oxy-fuel burners are moved upwardly in a direction toward the roof of the furnace and fuel and oxygen is fed to the oxy-fuel burners to provide high intensity, relatively short, flames directed downwardly into the furnace, and the end wall burners are fired and the furnace is reversed generally in the usual manner, however, the oxy-fuel burners, when in operation, are independent of furnace reversal. The charging of solid material is initiated before or after the oxy-fuel burners are fired and the oxy-fuel burners are adjusted heightwise so that the high intensity flames impinge directly onto the solid material, the position of the oxy-fuel burners being adjusted as required upon melting of the solid material. The foregoing operation continues until the charging of solid material is complete. For maximum efficiency and temperature the oxy-fuel burners should be adjusted heightwise to position the inner cone of the flame as close as possible to the charge as permitted by conditions of melting, temperature of the charge, size of area of charge directly affected by oxy-fuel burner flame and metal splash. After completion of the solid charge and banking of the furnace doors, hot metal is added to the furnace; fuel to the oxy-fuel burners being cut off prior, during or after the hot metal additions depending upon conditioning within the furnace. Immediately after the hot metal additions the oxy-fuel burners may be lowered to within several inches above the bath and then oxygen alone is discharged through the nozzles onto the bath to effect the required refining of the metal. During the refining period the heat input to the furnace may be reduced by decreasing the fuel input to the end walls burners or if additional heat is required fuel may be fed to the oxy-fuel burners.

The foregoing process results in a material decrease in the time required for a heat, that is the period between the beginning of the solid charge and tapping. The reduced time of the heat is achieved by the use of oxy-fuel burners which function to transfer rapidly into the charge an extraordinary large quantity of heat units. However, the remarkable reduction in heat time does not result merely from a more rapid melting of the solid charge which would be expected as a consequence of the additional heat input but from unobvious resulting factors which makes it possible to adopt novel operating procedures. In particular, the novel process permits the hot metal addition to be made immediately after completion of the solid charge and obtains a substantial reduction in the refining period as compared to conventional open hearth practice employing oxygen.

In spite of the fact that substantially greater heat has been introduced into the furnace and absorbed by the material in the furnace during the charging period, as compared to conventional practice, at completion of the solid charging the material within the furnace has not reached the condition necessary in normal practice for the hot metal addition. Thus, by practicing this embodiment of the present invention the charging time and melt down time of conventional practice has been reduced to the time required to complete the solid charge. The novel process therefore includes, in addition to the unique manner of introducing heat to the material within the furnace through the oxy-fuel burners, the step of adding hot metal after completion of the solid charge at a time when the temperature of the charge is non-uniform (the portions of the charge impinged upon by the high intensity flames from the oxy-fuel burners being at a higher temperature than portions of the charge removed from direct influence of the burners) and before the charge attains a substantially uniform temperature which is the condition existing when hot metal is added according to conventional practice.

While the greatest efficiency will be realized by adding hot metal as soon as possible after completion of the solid charging it will be appreciated that delays may exist between completion of the solid charge and hot metal addition. Such delays may be occasioned by required mechanical adjustment of equipment, such as the necessary banking of the furnace doors before hot metal additions, or may exist merely because a specific schedule of operation has been arbitrarily adopted. In any event, if the hot metal is added after completion of the solid charge but before the temperature of the charge becomes substantially uniform, such as the required condition of the charge for hot metal addition under conventional practice, substantial savings in time are obtainable and it is to be understood that the present process embraces such delayed hot metal additions.

A 200 ton open hearth furnace was operated according to the foregoing process producing several heats and the average time between the start of the charge and the tap was about three hours considering unrelated delays due to mechanical difficulties; the period between the initial charging and the hot metal addition averaging about forty-five minutes and the refining period averaging about two hours and fifteen minutes. When this performance is compared to operation of the same furnace according to normal oxygen practices the great advantages obtained by novel process become manifest; with the normal oxygen practice heats of about six hours were required, the time between initial charging and hot metal addition being about two hours and the refining time about four hours.

In view of the complex nature of the physical change and chemical reactions that take place during a heat in an open hearth furnace it is not possible to ascertain positively the reasons why the great advantages are obtained by the present process. In any event, the obtaining of such advantages is possible by the discovery that hot metal additions need not be postponed until the charge attains critical characteristics accompanied by a substantially uniform temperature throughout the charge but may be made after a predetermined quantity of heat is absorbed by the charge without regard to the distribution of such heat throughout the charge. In conventional open hearth furnaces to which the presently described embodiment relates, it is necessary to bank the furnace doors before hot metal additions and accordingly there would be no apparent advantage to supply to the charge the necessary heat units for hot metal additions prior to completion of the charge even though the unique character of the oxy-fuel burners would permit the obtaining of that result. Thus, in the present embodiment it is only necessary for optimum performance to apply to the charge the necessary heat units for hot metal additions at the time the charge is complete. In later described embodiments which may be considered as involving further modifications of conventional open hearth furnaces, it is practicable to supply to the charge the necessary heat for hot metal additions, and to add the hot metal, before the solid charge is complete, or, as a matter of fact to adopt a procedure in which solid charge and hot metal are simultaneously introduced into the furnace. Moreover, in accordance with the present embodiment, at the beginning of the refining stage the material in the furnace has absorbed a greater number of heat units than would be the case at the corresponding point of a heat according to conventional practice. The presence of additional heat in the charge, not only at the beginning of the refining period but also at least throughout a substantial portion of the refining period, is believed to result in more rapid decarburization and hence the heat may attain proper temperature and composition for tapping at an earlier time following the hot metal addition. Another factor influencing the obtained decrease in the refining time results from the novel step of charging hot metal at a time when the charge is at a substantially non-uniform temperature, that is, when portions of the scrap immediately below the oxy-fuel burners are at a very high temperature relative to other portions of the charge. Charging of hot metal under these conditions results in the formation of a foamy slag. The problems attendant the presence of a foamy slag in conventional operation of open hearth furnaces are not involved when practicing the present embodiment in view of the relatively great quantity of heat absorbed by the charge, or available for absorption, and it has been discovered that the presence of a foamy slag permits the use of higher oxygen flow rates during the refining period, as compared to permissible flow rates under conventional practice. In actual operation of a 200 ton open hearth furnace according to the present method oxygen flow rates through each of the two oxy-fuel burners in excess of 45,000 cubic feet per hour were employed. Such oxygen flow rates in the same furnace when operating according to conventional practice would result in excessive splashing and resulting roof damage and accordingly could not be used. Thus, the high heat content of the charge at the beginning of the refining stage and the presence of a foamy slag are two of the factors which make it possible to reduce the refining period according to the novel process.

It is understood, of course, that in order to achieve the full advantages obtainable by practicing the novel process it is necessary that the solid charge be completed as rapidly as possible and if the time required for the solid charging is slow it is possible that the charging time may be greater than the time required to introduce the required heat units into the charge. As mentioned above the present process was practiced in a 200 ton open hearth furnace employing two roof-mounted oxy-fuel burners while employing normal charging techniques and the solid charging was completed within forty-five minutes at which time the furnace was in a condition to receive the hot metal additions and flow of fuel to the oxy-fuel burners could be terminated. However, in open hearth furnaces of greater capacity, for example 500 tons, it is conceivable that unless rapid charging techniques are employed the required heat units may be to the charge before the solid charging is completed. In such a situation, although the hot metal would be added at an earlier time as compared to conventional practice and the refining time shortened, the full advantages obtainable from the present method could not be realized without employing a more efficient charging technique.

The 200 ton open hearth furnace operated in accordance with the present process employed end wall burners fed with Bunker C oil and oxygen according to conventional practice. Two oxy-fuel burners, mounted in the roof of the furnace for heightwise adjustment, were fed with natural gas and oxygen of about 99.5% purity and each included a discharge end having six one-half inch diameter openings, disposed at 30° relative to the longitudinal axis of the burner. During the scrap charging the discharge ends of the burner were located at least two feet above the scrap, and as the scrap melted the burners were lowered to maintain such spacing. After the hot metal addition and the beginning of the refining stage the discharge ends of the burners were lowered to a position about four inches above the bath. The following examples comprise data obtained during heats of the open hearth furnace described above in which the oil is rated at 165,000 B.t.u./gal., the natural gas rated at 1,000 B.t.u./M c.f.; the oxygen was of a purity of 99.5 percent, and in which the natural gas consumed is indicated in equivalent gallons of oil based on 150,000 B.t.u./gal. for oil:

EXAMPLE I

| | |
|---|---|
| Furnace charge: | |
| Scrap— | |
| No. 1 bales | 30,000 |
| Slab ends | 41,000 |
| Hot metal (*e.g., liquid pig iron*) | 160,000 |
| Lime | 7,500 |
| Furnace additions: | |
| Ore, pounds | [1] 8,000 |
| Ladle additions: | |
| Total metal, pounds | 1,800 |
| Total metal (furnace charge, furnace and ladle additions), pounds | 237,600 |
| Total ingot weight, pounds | 190,000 |
| Skull, pounds | 16,000 |
| Total tap weight, pounds | 206,000 |
| Yield, percent | 86.7 |
| Production rate, tons/hour | 44.53 |

[1] 4,800 pounds metal.

Oxygen, oil and natural gas consumption

A. From start of charge to start of hot metal addition:
- End wall burners—
  - Oil—224 gallons or 38,960,000 B.t.u.
  - Oxygen—none
- Oxy-fuel burners—
  - Natural gas—103 gallons or 15,450,000 B.t.u.
  - Oxygen—51,450 cubic feet B. From start of hot metal addition to tap:
- End wall burners—
  - Oil—653 gallons or 104,445,000 B.t.u.
  - Oxygen—none
- Oxy-fuel burners—
  - Natural gas—none
  - Oxygen—139,650 cubic feet

CARBON REDUCTION RATE

| Minutes after hot metal addition | Percent carbon | Oxygen flow oxy-fuel burners (c.f.h.) | Ore addition (pounds) |
|---|---|---|---|
| 19 | 1.39 | 94,000 | |
| 33 | 1.60 | 94,000 | 4,000 |
| 56 | 1.15 | 94,000 | 4,000 |
| 78 | 0.265 | 94,000 | |
| 84 | 0.07 | 94,000 | |

RATE OF TEMPERATURE RISE

| Minutes after hot metal addition | Temperature, ° F. | Burner oil flow (g.p.m.) | Oxygen flow oxy-fuel burners (c.f.h.) |
|---|---|---|---|
| 26 | 2,635 | 12 | 94,000 |
| 36 | 2,725 | 12 to 15 | 94,000 |
| 65 | 2,820 | 1.5 to 6 | 94,000 |
| 78 | 2,865 | 6 | 94,000 |
| 88 | 2,940 | 6 | 94,000 |

CHRONOLOGICAL HEAT LOG

| Minutes before hot metal addition | Event |
|---|---|
| 38 | Oxy-fuel burners on. Oxygen, 45,000 c.f.h./burner and natural gas 42,300 c.f.h. through burners; oil, 10 g.p.m. air, 980,000 c.f.h. |
| 36 | Start charge. |
| 27 | Finish charge. |
| 25 | Oxy-fuel burners lowered to 4′ above scrap. |
| 20–25 | Bank doors. |
| 16 | Oxy-fuel burners lowered to 3′ above scrap. |
| 05 | Start hot metal addition. Natural gas off on oxy-fuel burners. |
| 00 | Finish hot metal addition. Oil increased to 12 g.p.m. |
| 03 | Oxygen to oxy-fuel increased 47,000 c.f.h. and oxy-fuel burners positioned 4–6″ above slag. |
| 19 | Carbon 1.39%. |
| 26 | Temperature 2,635° F. |
| 33 | Carbon 1.60%. |
| 36 | Temperature 2,725° F. |
| 38 | Oil decreased to 5 g.p.m., air 820,000 c.f.h. |
| 42 | ¼ box ore (1,000 pounds) added. |
| 44 | ¼ box ore (1,000 pounds) added. |
| 46 | ½ box ore (2,000 pounds) added. |
| 51 | Red fumes coming from stack, same as when 25,000 c.f.h. $O_2$ lance was used. |
| 56 | Carbon 1.15%. |
| 56 | Oil reduced to 1.56 g.p.m., air; 520,000 c.f.h. |
| 65 | Temperature 2,820° F. |
| 69 | One box ore (4,000 pounds) added. |
| 69 | Oil increased to 6 g.p.m. |
| 78 | Temperature 2,865° F. |
| 78 | Carbon 0.265% (bath clear and settled). |
| 84 | Bath flat (i.e., less than 0.07% C.). |
| 88 | Temperature 2,920° F. |
| 89 | Temperature 2,940° F. |
| 91 | Oxygen turned off oxy-fuel burners. |
| 92 | Tap (heat broke out through tap hole). |

EXAMPLE II

| | | |
|---|---|---|
| Furnace charge: | | |
| Scrap— | | |
| No. 1 bales | pounds | 27,000 |
| Slab ends | do | 105,000 |
| Hot metal | do | 213,000 |
| Lime | do | 8,000 |
| Furnace additions: | | |
| Ore | pounds | [1] 6,000 |
| Ladle additions: | | |
| Total metal | pounds | 2,750 |
| Total metal furnace charge, furnace and ladle additions) | pounds | 351,350 |
| Total ingot weight | do | 315,200 |
| Skull | do | 1,000 |
| Total tap weight | do | 316,200 |
| Yield | percent | 90.0 |
| Production rate | tons/hour | 63.04 |

[1] 3,600 pounds metal.

Oxygen, oil and natural gas consumption

A. From start of charge to start of hot metal addition:
- End wall burners—
  - Oil—321 gallons or 52,965,000 B.t.u.
  - Oxygen—9,500 cubic feet
- Oxy-fuel burners:
  - Natural gas—187 gallons or 28,050,000 B.t.u.
  - Oxygen—33,150 cubic feet B. From start of hot metal addition to:
End wall burners:
Oil—935 gallons or 154,275,000 B.t.u.
Oxygen—14,500 cubic feet
Oxy-fuel burners:
Natural gas—None
Oxygen—177,975 cubic feet

CARBON REDUCTION RATE

| Minutes after hot metal addition | Percent carbon | Oxygen flow oxy-fuel burners (c.f.h.) | Ore addition (pounds) |
|---|---|---|---|
| 41 | 3.67 | 94,000 | |
| 52 | 3.30 | 94,000 | |
| 63 | 1.875 | 94,000 | |
| 75 | 1.27 | 94,000 | 1,500 |
| 91 | 0.625 | 94,000 | 4,500 |
| 95 | 0.49 | 94,000 | |
| 100 | 0.24 | 94,000 | |
| 106 | 0.11 | 94,000 | |

RATE OF TEMPERATURE RISE

| Minutes after hot metal addition | Temperature, ° F. | Burner oil flow (g.p.m.) | Oxygen flow oxy-fuel burners (c.f.h.) |
|---|---|---|---|
| 43 | 2,590 | 11 | 94,000 |
| 56 | 2,675 | 6 | 94,000 |
| 63 | 2,740 | 6 | 94,000 |
| 75 | 2,790 | 2 | 94,000 |
| 92 | 2,770 | 2 to 8 | 94,000 |
| 99 | 2,830 | 8 | 94,000 |
| 105 | 2,880 | 8 | 94,000 |
| 115 | 2,900 | 6 | 94,000 |

CHRONOLOGICAL HEAT LOG

| Minutes before hot metal addition | Event |
|---|---|
| 39 | Oxy-fuel burners on. Oxygen 45,000 c.f.h./burner, natural gas 5.8 equivalent g.p.m. burner. |
| 39 | End wall burner oxygen at 25,000 c.f.h. oil, 11 g.p.m., air 970,000 c.f.h. |
| 39 | Start charge. |
| 29 | Finish charge. |
| 27 | Start banking doors. |
| 23 | Finish banking doors. |
| 12 | Reversal time decreased from 6 to 4 minutes. |
| 07 | Natural gas off oxy-fuel burners. |
| 07 | Start hot metal. |
| 06 | Oxygen off end wall burners. |
| 04 | Increase oxygen to 47,000 c.f.h./oxy-fuel burner. |
| 00 | Finish hot metal. |
| 01 | Oxy-fuel burners positioned approximately 6" above slag. |
| 03 | Oxygen on end wall burners at 25,000 c.f.h.; oil 11 g.p.m.; air 970,000 c.f.h. |
| 05 | Steel leaking through tap hole. |
| 16 | Tap hole seems to be frozen. |
| 32 | Large amount of red fumes coming from stack. |
| 38 | Oxygen off end wall burners; oil reduced to 9 g.p.m.; air 950,000 c.f.h. |
| 41 | Carbon 3.67%. |
| 43 | Temperature 2,590° F. |
| 45 | Oil reduced to 6 g.p.m. |
| 52 | Carbon 3.30%. |
| 56 | Start flush. |
| 56 | Temperature 2,675° F. |
| 63 | Carbon 1.875%. |
| 63 | Temperature 2,740° F. |
| 65 | Oil decreased to 2 g.p.m. |
| 67 | ½ box ore (1,500 pounds) added. |
| 75 | Carbon 1.27%; temperature 2,790° F. |
| 79 | 1½ boxes ore (4,500 pounds) added. |
| 86 | Oil increased to 8 g.p.m. |
| 91 | Carbon 0.625%. |
| 92 | Temperature 2,770° F. |
| 95 | Carbon 0.49%. |
| 99 | Temperature 2,830° F. |
| 100 | Carbon 0.24%. |
| 105 | Oil reduced to 6 g.p.m. |
| 105 | Temperature 2,880° F. |
| 106 | Oxygen to oxy-fuel burners decreased to 20,000 c.f.h./burner due to difficulty in tapping. |
| 106 | Carbon 0.11%. |
| 110 | Oil increased to 8 g.p.m. |
| 111 | Spar additions (5-10 shovels). |
| 111 | Ready to tap but difficulty with the tap hole prevented tapping. |
| 115 | Temperature 2,900° F. |
| 121 | Start actual tap. |
| 125 | Tap hole frozen. |
| 136 | Start steel flowing through tap hole. |

EXAMPLE III

Furnace charge:
Scrap—
No. 1 bales ____ pounds__ 23,000
Slab ends ____ do____ 115,000
Hot metal ____ do____ 204,000
Lime ____ do____ 8,000
Furnace additions:
Ore ____ pounds__ [1] 6,000
Total metal (furnace charge, furnace additions) pounds__ 349,200
Total ingot weight ____ do____ 269,401
Skull ____ do____ 2,000
Butt ____ do____ 4,591
Total tap weight ____ do____ 275,992
Yield ____ percent__ 76.84
Production rate ____ tons/hour__ 56.60

[1] 3,600 pounds metal.

Oxygen, oil and natural gas consumption

A. From start of charge to start of hot metal addtion:
End wall burners—
Oil—301 gallons or 49,665,000 B.t.u.
Oxygen—10,000 cubic feet
Oxy-fuel burners—
Natural gas—142 gallons or 21,300,000 B.t.u.
Oxygen—34,800 cubic feet
B. From start of hot metal addition to tap:
End wall burners—
Oil—886 gallons or 146,190,000 B.t.u.
Oxygen—9,500 cubic feet
Oxy-fuel burners:
Natural gas—86 gallons or 12,900,000 B.t.u.
Oxygen—188,625 cubic feet

CARBON REDUCTION RATE

| Minutes after hot metal addition | Percent carbon | Oxygen flow oxy-fuel burners (c.f.h.) | Ore addition (pounds) |
|---|---|---|---|
| 43 | 2.82 | 96,000 | |
| 55 | 2.27 | 96,000 | |
| 70 | 1.68 | 96,000 | |
| 81 | 1.20 | 96,000 | |
| 100 | 0.26 | 96,000 | 6,000 |
| 105 | 0.10 | 96,000 | |

RATE OF TEMPERATURE RISE

| Minutes after hot metal addition | Temperature, ° F. | Burner oil flow (g.p.m.) | Oxygen flow oxy-fuel burners (c.f.h.) |
|---|---|---|---|
| 49 | 2,500 | 8 | 96,000 |
| 60 | 2,590 | 8 | 96,000 |
| 69 | 2,630 | 8 | 96,000 |
| 76 | 2,670 | 8 | 96,000 |
| 85 | 2,740 | 6 | 96,000 |
| 96 | 2,740 | 6 to 3<br>3 to 6 | 96,000 |
| 106 | 2,815 | 6 | 96,000 |
| 111 | 2,865 | 8 | 96,000 |

CHRONOLOGICAL HEAT LOG

| Minutes before hot metal addition | Event |
|---|---|
| 35 | Oxygen on oxy-fuel burners at 45,000 c.f.h./burner. |
| 33 | Natural gas on north burner at 31,500 c.f.h. |
| 30 | Start charge. |
| 28 | Natural gas on south burner at 25,000 c.f.h. South burner on later than north burner due to minor delay. Oil increased from 4 to 12 g.p.m. Oxygen on end wall burners at rate of 25,000 c.f.h. Air 1,000,000 c.f.h. |
| 17 | Finish charge. |
| 15 | Start to bank doors. |
| 15 | Lower oxy-fuel burners to 3-4' above scrap. |
| 06 | Start hot metal. |
| 06 | Air decreased to 860,000 c.f.h. |
| 02 | Start second ladle hot metal. |
| 00 | Finish hot metal. End wall burner oxygen reduced to 20,000 c.f.h. |
| 03 | Natural gas off oxy-fuel burners. |
| 06 | Natural gas on oxy-fuel burners again due to large scrap pile under oxy-fuel burners. |
| 12 | Natural gas off oxy-fuel burners; oxy-fuel burners lowered to bath; oxygen, 48,000 c.f.h. per oxy-fuel burner. |
| 25 | Oxygen off end wall burners; oil reduced to 10 g.p.m. |
| 31 | Oil reduced to 6 g.p.m. |
| 43 | Carbon 2.82%. |
| 45 | Oil increased to 8 g.p.m. |
| 49 | Temperature 2,500° F. |
| 56 | Carbon 2.72%. |
| 57 | Flush started. |
| 60 | Temperature 2,590° F. |
| 69 | Temperature 2,630° F.; Carbon 1.68%. |
| 76 | Temperature 2,670° F. |
| 77 | Oil reduced to 6 g.p.m. |
| 81 | Carbon 1.20%; FeO 33.55. |
| 84 | Decrease oil to 3 g.p.m. |
| 85 | Temperature 2,740° F. |
| 88 | Add one box ore; foamy slag flushed. |
| 94 | Oil increased to 6 g.p.m. |
| 96 | Temperature 2,740° F. |
| 100 | Carbon 0.26; FeO 26.21. |
| 102 | Spar addition (shovels). |
| 105 | Carbon 0.10. |
| 106 | Temperature 2,815° F. |
| 107 | Increased oil to 8 g.p.m. |
| 111 | Temperature 2,865° F. |
| 113 | Tap. |

EXAMPLE IV

| | | |
|---|---|---|
| Furnace charge: | | |
| Scrap— | | |
| No. 1 bales | pounds | 41,600 |
| Slab ends | do | 119,000 |
| Hot metal | do | 234,000 |
| Lime | do | 10,000 |
| Furnace additions— | | |
| Ore | do | [1] 4,000 |
| Ladle additions— | | |
| Total metal | do | 1,750 |
| Total metal (furnace charge, furnace and ladle additions) | pounds | 407,150 |
| Total ingot weight | do | 344,000 |
| Skull | do | 500 |
| Total tap weight | do | 344,500 |
| Yield | percent | 84.63 |
| Production rate | tons/hour | 54.95 |

[1] 2,400 pounds metal.

Oxygen, oil and natural gas consumption

A. From start of charge to start of hot metal addition:
- End wall burners—
  - Oil—477 gallons or 78,705,000 B.t.u.
  - Oxygen—12,000 cubic feet
- Oxy-fuel burners—
  - Natural gas—394 gallons or 39,456,000 B.t.u.
  - Oxygen—55,525 cubic feet B. From start of hot metal addition to tap:
- End wall burners—
  - Oil—1,129 gallons or 186,285,000 B.t.u.
  - Oxygen—3,500 cubic feet
- Oxy-fuel burners—
  - Natural gas—58 gallons or 8,700,000 B.t.u.
  - Oxygen—214,350 cubic feet

CARBON REDUCTION RATE

| Minutes after hot metal addition | Percent carbon | Oxygen flow oxy-fuel burners (c.f.h.) | Ore addition (pounds) |
|---|---|---|---|
| 40 | 2.770 | 98,000 | |
| 52 | 2.424 | 98,000 | |
| 79 | 1.388 | 98,000 | |
| 95 | 1.021 | 98,000 | |
| 111 | 0.584 | 98,000 | 3,000 |
| 124 | 0.252 | 98,000 | 1,000 |
| 135 | 0.069 | 98,000 | |

RATE OF TEMPERATURE RISE

| Minutes after hot metal addition | Temperature, ° F. | Burner oil flow (g.p.m.) | Oxygen flow oxy-fuel burners (c.f.h.) |
|---|---|---|---|
| 53 | 2,480 | 8 | 98,000 |
| 66 | 2,530 | 5.8 | 98,000 |
| 75 | 2,610 | 6 to 8 | 98,000 |
| 87 | 2,680 | 8 | 98,000 |
| 92 | 2,715 | 8 | 98,000 |
| 101 | 2,780 | 8 to 6 | 98,000 |
| 111 | 2,810 | 6 to 5 | 98,000 |
| 125 | 2,880 | 5 | 98,000 |
| 136 | 2,930 | 5 | 98,000 |

CHRONOLOGICAL HEAT LOG

| Minutes before hot metal addition | Event |
|---|---|
| 50 | Oxy-fuel burners on at 45,000 c.f.h. burner and total 59,400 c.f.h. natural gas. |
| 50 | Oil 12 g.p.m.; end wall burner oxygen at 20,000 c.f.h. |
| 48 | Start charge. |
| 27 | Finish charge. |
| 26 | Lower oxy-fuel burners to 3' above scrap. |
| 24 | Start banking doors. |
| 18-14 | Limit switch out on #1 door, 4 minute delay. |
| 13 | Finish banking doors. |
| 13-10 | Delay 3 minutes to obtain shaker for flush hole. |
| 08 | Start hot metal. |
| 00 | Finish hot metal. |
| 01 | Natural gas off oxy-fuel burners. |
| 02 | North oxy-fuel burner lowered to bath. Oxygen flow 49,000 c.f.h./oxy-fuel burner. |
| 12 | Oxygen off end wall burners. |
| 16 | South oxy-fuel burner lowered to bath (delay caused by snagged cable). |
| 36 | Oil reduced to 10 g.p.m. |
| 40 | Carbon 2.770%. |
| 43 | Oil decreased to 8 g.p.m.; two minute reversals. |
| 44 | Good flush started. |
| 45 | Oil increased to 10 g.p.m. |
| 52 | Carbon 2.424%. |
| 53 | Temperature 2,480° F. |
| 56 | Oil decreased to 3.5 g.p.m. |
| 60 | Oil increased to 5 g.p.m.; four minute reversals. |
| 65 | Oil increased to 6 g.p.m. |
| 66 | Temperature 2,530° F. |
| 72 | Oil increased to 8 g.p.m. |
| 75 | Temperature 2,610° F. |
| 79 | Carbon 1.388%. |
| 87 | Temperature, 2,680° F. |
| 92 | Temperature 2,715° F. |
| 95 | Carbon 1.012%. |
| 95 | Oil decreased to 6 g.p.m. |
| 101 | Temperature 2,780° F. |
| 102 | ½ box ore added followed by heavy flush. |
| 109 | Oil decreased to 5 g.p.m. |
| 111 | Temperature 2,810° F. |
| 111 | Carbon 0.584%. |
| 117 | 1000# ore added followed by heavy flush. |
| 124 | Carbon 0.252%. |
| 125 | Temperature 2,880° F. |
| 129 | Spar addition (shovels). |
| 135 | Carbon 0.069%. |
| 136 | Temperature 2,930° F. |
| 137 | Oxygen off south oxy-fuel burner. |
| 139 | Oxygen off north oxy-fuel burner. |
| 140 | Tap. |

EXAMPLE V

| | | |
|---|---|---|
| Furnace charge: | | |
| Scrap— | | |
| No. 1 bales | pounds | 66,000 |
| Slab ends | do | 118,000 |
| Hot metal | do | 206,800 |
| Lime | do | 7,000 |
| Furnace additions: | | |
| Ore | do | [1] 12,000 |
| Ladle additions: | | |
| Total metal | do | 2,250 |
| Total metal (furnace charge, furnace and ladle additions) | pounds | 407,450 |
| Total ingot weight | do | 342,874 |
| Skull | do | 2,000 |
| Total tap weight | do | 344,874 |
| Yield | percent | 84.63 |
| Production rate | tons/hour | 56.2 |

[1] 7,200 pounds metal.

Oxygen, oil and natural gas consumption

A. From start of charge to start of hot metal addition:
End wall burners—
Oil—502 gallons or 82,830,000 B.t.u.
Oxygen—13,000 cubic feet
Oxy-fuel burners—
Natural gas—229 gallons or 34,300,000 B.t.u.
Oxygen—57,300 cubic feet B. From start of hot metal addition to:
End wall burners—
Oil—1002 gallons or 165,330,000 B.t.u.
Oxygen—8,500 cubic feet
Oxy-fuel burners—
Natural gas—52 gallons or 7,800,000 B.t.u.
Oxygen—210,150 cubic feet

CARBON REDUCTION RATE

| Minutes after hot metal addition | Percent carbon | Oxygen flow oxy-fuel burners (c.f.h.) | Ore addition (pounds) |
|---|---|---|---|
| 47 | 2.107 | 94,000 | |
| 61 | 2.552 | 94,000 | |
| 73 | 1.772 | 94,000 | |
| 88 | 1.210 | 94,000 | 6,000 |
| 100 | 1.000 | 94,000 | |
| 117 | 0.250 | 94,000 | 6,000 |
| 129 | 0.075 | 94,000 | |

RATE OF TEMPERATURE RISE

| Minutes after hot metal addition | Temperature, °F. | Burner oil flow (g.p.m.) | Oxygen flow oxy-fuel burners (c.f.h.) |
|---|---|---|---|
| 62 | 2,590 | 5 | 94,000 |
| 75 | 2,660 | 5 to 4<br>4 to 2 | 94,000 |
| 93 | 2,720 | 4 | 94,000 |
| 115 | 2,785 | 3 | 94,000 |
| 121 | 2,795 | 10 | 94,000 |
| 128 | 2,855 | 8 | 94,000 |
| 133 | 2,890 | 8 | 94,000 |

CHRONOLOGICAL HEAT LOG

| Minutes before hot metal addition | Event |
|---|---|
| 50 | Oxy-fuel burners on at 45,000 c.f.h./oxy-fuel burner; natural gas flow 3 g.p.m.; oil 6 g.p.m. |
| 49 | Start charge. |
| 46 | End wall burner oxygen at 20,000 c.f.h.; oil 12 g.p.m.; 11 minute reversals. |
| 28 | Finish charge. |
| 23 | Start banking doors. |
| 20 | Finish banking doors. |
| 11 | 4 minute reversals. |
| 07 | Start hot metal (scrap very hot). |
| 05 | Lower oxy-fuel burners to 3' above scrap. |
| 00 | Finish hot metal. |
| 01 | Natural gas off oxy-fuel burners. |
| 01 | Oxygen off end wall burners. |
| 01 | Oxy-fuel burners oxygen at 47,000 c.f.h./oxy-fuel burner. |
| 05 | Oxygen on end wall burners at 10,000 c.f.h. to melt ends. |
| 24 | Oxygen off end wall burners. |
| 25 | Oil at 10 g.p.m. |
| 47 | Carbon 2.107%. |
| 52 | Oil reduced to 5 g.p.m. |
| 53 | Start flush on reversals. |
| 61 | Carbon 2.552%. |
| 62 | Oil reduced to 4.0 g.p.m. |
| 62 | Temperature 2,590° F. |
| 64 | Oil reduced to 2 g.p.m. |
| 65 | Start good flush. |
| 67 | Oil off; and draft both ways. |
| 71 | Start reversal. No oil. |
| 73 | Carbon 1.772%. |
| 75 | Temperature 2,660° F. |
| 79 | Oil on at 4 g.p.m. |
| 79 | 1 box ore added followed by heavy flush. |
| 82 | Oil increased to 5 g.p.m. |
| 88 | Carbon 1.210%. |
| 93 | Temperature 2,720° F. |
| 95 | Start good flush. |
| 100 | Carbon 1.00%. |
| 104 | Oil off; draft both ways. |
| 105 | Draft on. |
| 106 | ½ box ore added. |
| 106 | Oil on at 1 g.p.m. |
| 108 | ½ box ore added. |
| 115 | Temperature 2,785° F. |
| 115 | Oil increased to 10 g.p.m. |
| 117 | Carbon 0.25%. |
| 120 | Spar addition. |
| 121 | Temperature 2,795° F. |
| 124 | Oil decreased to 9 g.p.m. |
| 126 | Oil decreased to 5 g.p.m. |
| 128 | Temperature 2,855° F. |
| 129 | Carbon 0.075%. |
| 129 | Oil increased to 9 g.p.m. |
| 130 | Oxygen flow through north oxy-fuel burner decreased to 35,000 c.f.h. |
| 133 | Temperature 2,890° F. |
| 134 | Tap. |

EXAMPLE VI

| | | |
|---|---|---|
| Furnace charge: | | |
| Scrap— | | |
| No. 1 bales | pounds | 69,000 |
| Slab ends | do | 113,000 |
| Hot metal | do | 213,000 |
| Lime | do | 8,200 |
| Furnace additions— | | |
| Butts | do | 23,000 |
| Ore | do | [1] 6,000 |
| Ladle additions— | | |
| Total metal | do | 2,500 |
| Total metal (furnace charge, furnace and ladle additions) | pounds | 424,100 |
| Total ingot weight | do | 345,400 |
| Butt | do | 2,000 |
| Total tap weight | do | 347,400 |
| Yield | percent | 81.90 |
| Production rate | tons/hour | 55.18 |

[1] 3,600 pounds metal.

Oxygen, oil and natural gas consumption

A. From start of charge to start of hot metal addition:
End wall burners—
Oil—583 gallons or 96,195,000 B.t.u.
Oxygen—1,900 cubic feet
Oxy-fuel burners—
Natural gas—342 gallons or 51,300,000 B.t.u.
Oxygen—64,050 cubic feet B. From start of hot metal addition to tap:

End wall burners—

Oil—1,009 gallons or 166,485,000 B.t.u.

Oxygen—1,250 cubic feet

Oxy-fuel burners—

Natural gas—27 gallons or 4,050,000 B.t.u.

Oxygen—222,375 cubic feet

CARBON REDUCTION RATE

| Minutes after hot metal addition | Percent carbon | Oxygen flow oxy-fuel burners (c.f.h.) | Ore addition (pounds) |
|---|---|---|---|
| 35 | 2.61 | 99,000 | |
| 46 | 2.30 | 99,000 | |
| 59 | 1.91 | 99,000 | |
| 74 | 1.62 | 99,000 | 6,000 |
| 122 | 0.07 | 99,000 | |

RATE OF TEMPERATURE RISE

| Minutes after hot metal addition | Temperature, ° F. | Burner oil flow (g.p.m.) | Oxygen flow oxy-fuel burners (c.f.h.) |
|---|---|---|---|
| 38 | 2,520 | 10 | 99,000 |
| 50 | 2,600 | 10 to 7.8 | 99,000 |
| 57 | 2,620 | 7.8 to 3.1 | 99,000 |
| 75 | 2,670 | 3.1 | 99,000 |
| 116 | 2,800 | 3.1 to 0<br>0 to 9.2 | 99,000 |
| 118 | 2,810 | 11.7 | 99,000 |
| 123 | 2,855 | 11.7 | 99,000 |
| 128 | 2,855 | 11.7 | 99,000 |

CHRONOLOGICAL HEAT LOG

| Minutes before hot metal addition | Event |
|---|---|
| 61 | Oxy-fuel burners on with oxygen at 38,000 c.f.h./burner and natural gas at 7.3 g.p.m. total. |
| 59 | Start charge. |
| 58 | Oxygen on end wall burner at 20,000 c.f.h. |
| 56 | Oil at 11.9 g.p.m.; 11.2 minute reversals. |
| 46 | Oxy-fuel burner oxygen increased to 40,000 c.f.h./burner and natural gas decreased to 7.1 g.p.m. total. |
| 35 | Finish charge. |
| 34 | Lower oxy-fuel burner to approximately 3½' above bath. |
| 33-25 | Finishing banking of doors. |
| 24 | Oil increased to 12.4 g.p.m.; 4.8 minute reversals. |
| 12 | Start hot metal. |
| 08 | Natural gas off of oxy-fuel burners. |
| 03 | Oxy-fuel burner oxygen increased to 49,500 c.f.h./burner. |
| 00 | Finish hot metal. |
| 22 | Oxygen off end wall burners. |
| 24 | Oil decreased to 10 g.p.m. |
| 35 | Carbon 2.61%. |
| 38 | Temperature 2,520° F. |
| 46 | Carbon 2.30%. |
| 46 | Oil decreased to 7.8 g.p.m. |
| 50 | Temperature, 2,600° F. |
| 51 | Light flush; foam rising rapidly. |
| 53 | Oil decreased to 3.1 g.p.m. |
| 57 | Temperature 2,620° F. |
| 59 | Carbon 1.91%. |
| 62 | Heavy flush. |
| 63 | 6000 bloom butts added. |
| 74 | Carbon 1.62%. |
| 75 | Temperature 2,670° F. |
| 79 | 8000# bloom butts added. |
| 79 | Heavy flush at #5 and #3 doors. |
| 80 | Oil off end wall burners; both dampers open. |
| 82 | 9000# bloom butts added. |
| 85 | 6000# ore added. |
| 91 | Oil on at 5 g.p.m.; 5 minute reversals. |
| 104 | Spar-several shovels; oil on at 7.4 g.p.m. |
| 108 | Carbon-soft, bath solidified inside #3 and #4 doors. |
| 112 | Spar-several shovels. |
| 113 | Oil increased to 9.2 g.p.m. |
| 116 | Temperature 2,800° F. |
| 116 | Oil increased to 11.6 g.p.m. |
| 118 | Temperature 2,810° F. |
| 122 | Carbon 0.07%. |
| 123 | Temperature 2,855° F. |
| 125 | Spar-shoveled in #3 door, bath appears frozen. |
| 128 | Temperature 2,885° F. |
| 129 | Tap (self tapping heat). |

One of the advantages of the present invention is that it enables complete control of the furnace atmosphere, even to the point of totally eliminating feed air and introducing substantially all of the furnace atmosphere through the jet burners. In view of the fact that air is 80% nitrogen, there is thus avoided the problem of heating up great masses of nitrogen and recovering its heat content, so that the total quantity of gases passing through the furnace as furnace atmosphere is enormously reduced, as is also the need for heat exchange equipment. Indeed, the elimination or substantial elimination of nitrogen from the burner flame by feeding oxygen of a purity of 90% or greater to the oxy-fuel burner enables the use of a very much smaller flame to supply the same heat values or even substantially to increase the heat supplied to the operation by the flame as compared to conventional practice; and this in turn makes it possible to play the smaller flame on the material from a short distance, thereby to transfer substantially all the heat of the flame to the material by convection rather than by radiation, with the accompanying reduction in heat losses and furnace lining damage referred to above. The possibility of eliminating end wall burners and of greatly reducing the size of the flame also makes it possible radically to alter the construction of the furnace so as to provide a very much simpler structure.

Figure 5:
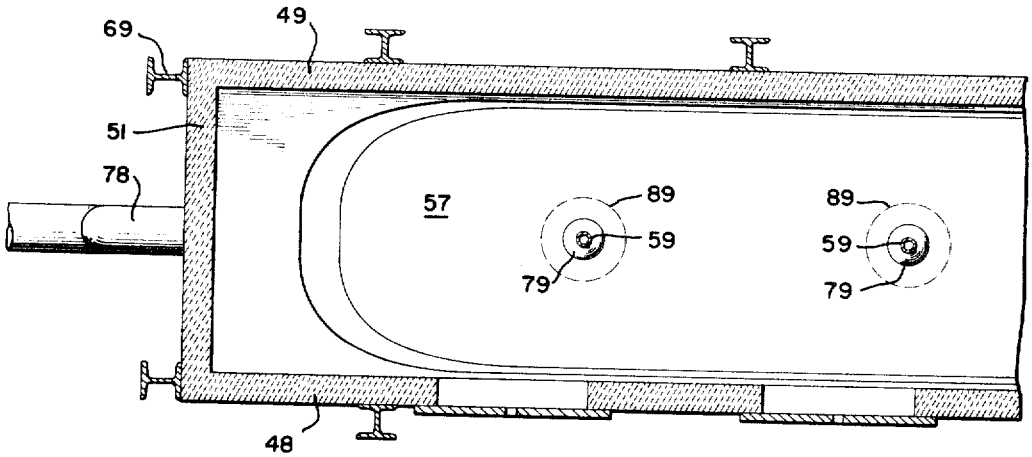
FIGURE 5 is a view in horizontal section taken on the line 5—5 of FIGURE 4.

In view of these new considerations, the structure of furnaces such as the conventional open hearth furnace can advantageously be further modified as shown in the embodiment of FIGURES 4 and 5. It will be recognized that the structure of FIGURES 4 and 5 maintains the overall configuration of an open hearth furnace according to FIGURES 1, 2 and 3, but with three principal modifications: the end wall burners are eliminated entirely; the jet devices extend through the roof instead of through the end walls; and the checker system is eliminated.

Referring to FIGURES 4 and 5 in greater detail, there is shown an elongated furnace of the open hearth type having a bottom 47, a front wall 48, a back wall 49, and a pair of end walls 51 only one of which is shown. A roof 53 is provided, and the furnace is lined with conventional fire brick so as to provide a hearth 55 for the reception of a charge of material, which is shown in the illustrated embodiment during a refining period as a bath of molten metal 57.

A plurality of elongated jet devices 59 is provided, spaced apart lengthwise of the furnace, and each treats the subjacent portion of the bath. They extend through the roof, however, instead of through the end walls; and for this purpose, mounting means 61 are provided lengthwise slidably to receive jet devices 59, these mounting means allowing vertical axial movement thereof. Each jet device 59 has a rack 63 secured lengthwise thereto and in mesh with a pinion rotatable about a horizontal axis by manipulation of a hand wheel 65, the pinion and hand wheel assembly being carried by vertical sleeve 67 in which jet device 59 and rack 63 are mounted for vertical sliding movement. Sleeve 67, in turn, is supported by legs on the furnace, directly above mounting means 61. By this mechanism, manipulation of hand wheel 65 will raise or lower jet device 59 as desired.

In order to provide support for this arrangement, a frame 69 of I-beams is provided, including a plurality of upright stub columns 71 along the end and side walls of the furnace, interconnected at their upper ends by longitudinal beams 73 and transverse beams 75, the beams 73 and 75 carrying on their upper surfaces deck plates 77 apertured for the reception therethrough of the jet devices.

Figure 6:
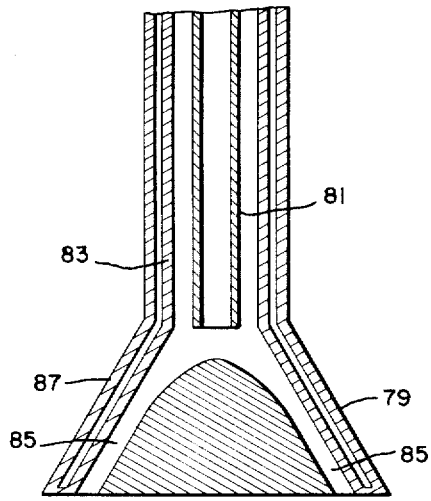
FIGURE 6 is an enlarged view in cross section of the discharge end of a jet device according to the present invention.
Figure 7:
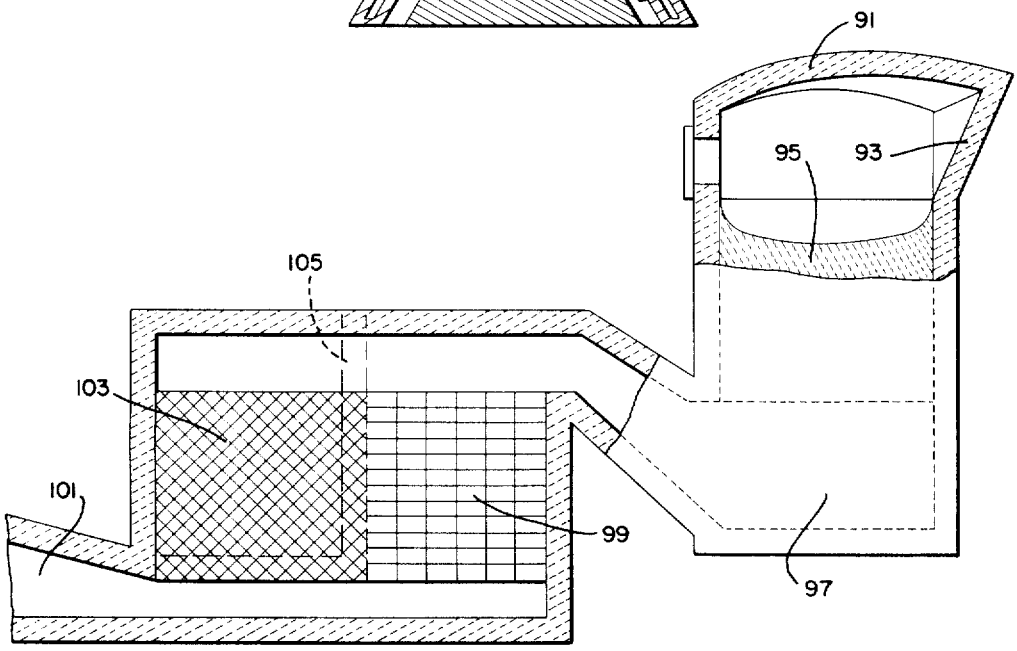

As the jet devices of the embodiment of FIGURES 4 and 5 are not universally movable but only vertically adjustable, the flames would tend to be concentrated only in a single spot if the lower ends were simply cylindrical as in the case of the preceding embodiment. Therefore, a flared or bell-shaped configuration is imparted to the lower ends of the jet devices, as best seen in section in FIGURE 6. As is there shown, each jet device has a conical lower end or nozzle 79, and the central conduit 81 which carries the fuel does not extend down substantially below the cylindrical portion of the jet device. Outer conduit 83 follows the upper cylindrical and lower conical configuration of the jet device, and it is between conduits 81 and 83 that the oxygen passes. The annular passageway bounded by conduit 83 terminates downward in a plurality of separate, diverging outlets 85. These are directed downward at angles to the horizontal of substantially greater than 25°. A water jacket 87 comprises the outer shell of the jet devices and is spaced outwardly of conduit 83 so as to provide an upper cylindrical and lower conical water chamber which is divided lengthwise of the jet device into two separate portions that communicate only at the lower end, so as to cause the cooling water to follow the path described above in connection with FIGURE 1. There is thus provided a device in which flames issue from nozzle 79 in downwardly divergent relationship so as more uniformly to distribute the points of contact of the flame with the bath, as indicated by the circles 89 in FIGURE 5.

The atmosphere of the furnace of FIGURE 4 is comprised substantially entirely of the gases introduced through jet devices 59 plus the gaseous reaction products of those gases with the impurities or other substances in the charge. In the case of a steel making operation, for example, in which a hydrocarbon fuel is introduced in admixture with oxygen through the jets, and in which the material removed in vapor phase from the charge is considered to be primarily carbon, the furnace atmosphere will be principally carbon monoxide, carbon dioxide and water vapor plus excess hydrocarbon fuel or excess oxygen. The iron oxide may be considered to be in solid phase as smoke. The volume of gases that must be removed from the furnace is therefore greatly decreased, and can be handled by a relatively small discharge conducit 78. There is no need to provide heat exchange checker systems for this relatively small volume of gas, and it can be used directly to heat the separate components of the fuel or oxygen feed to the jet devices, or to preheat the charge. There is thus provided an arrangement in which conventional furnace construction is greatly simplified by the total elimination of the usual extensive heat exchange systems and gas handling equipment. Of course, the jet devices of FIGURE 4 could if desired be replaced by jet devices constructed in accordance with FIGURE 1 and extending through the end walls or the back wall.

Figure 7:
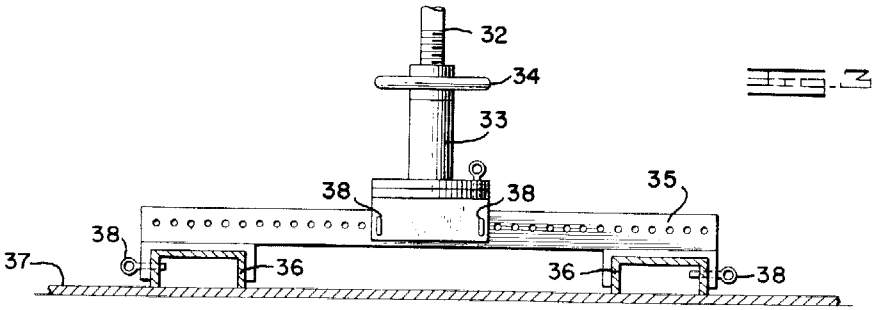
FIGURE 7 is a view in cross section of a modified open hearth furnace according to the present invention.

A less radical departure from present or conventional open hearth furnace construction is suggested by a further embodiment as seen in FIGURE 7. There, a furnace 91 is shown in transverse cross-section, the furnace having a rear wall 93 and a hearth 95. The checker system for the furnace is preserved, but in modified form. Therefore, at the ends of the furnace, the gas passageways communicate between the interior of the furnace and a slag pocket 97 which in turn leads to checkers 99. The checkers 99 communicate with the ambient atmosphere through flues 101.

Specifically, the modification of FIGURE 7 differs from conventional construction in two respects: (1) a substantial portion of the heat requirements of the operation is supplied by means of oxy-fuel jet devices of the present invention, extending through the roof or the end walls or the back wall; and (2) a portion 103 of the checkers is eliminated and the wall 105 of the checker chamber which serves as the bulkhead is correspondingly changed in position as seen in broken lines in FIGURE 7 so as to provide a checker chamber of reduced volume corresponding to the reduction in the quantity of heat exchange material therein. It will be understood that the elimination or substantial reduction of the nitrogen in the furnace atmosphere by the use of oxy-fuel mixtures of the present invention enables such provision of smaller and less expensive heat exchange systems. Thus, the embodiment of FIGURE 7 is a step midway between the embodiments of FIGURES 1 and 4.

Figure 8:
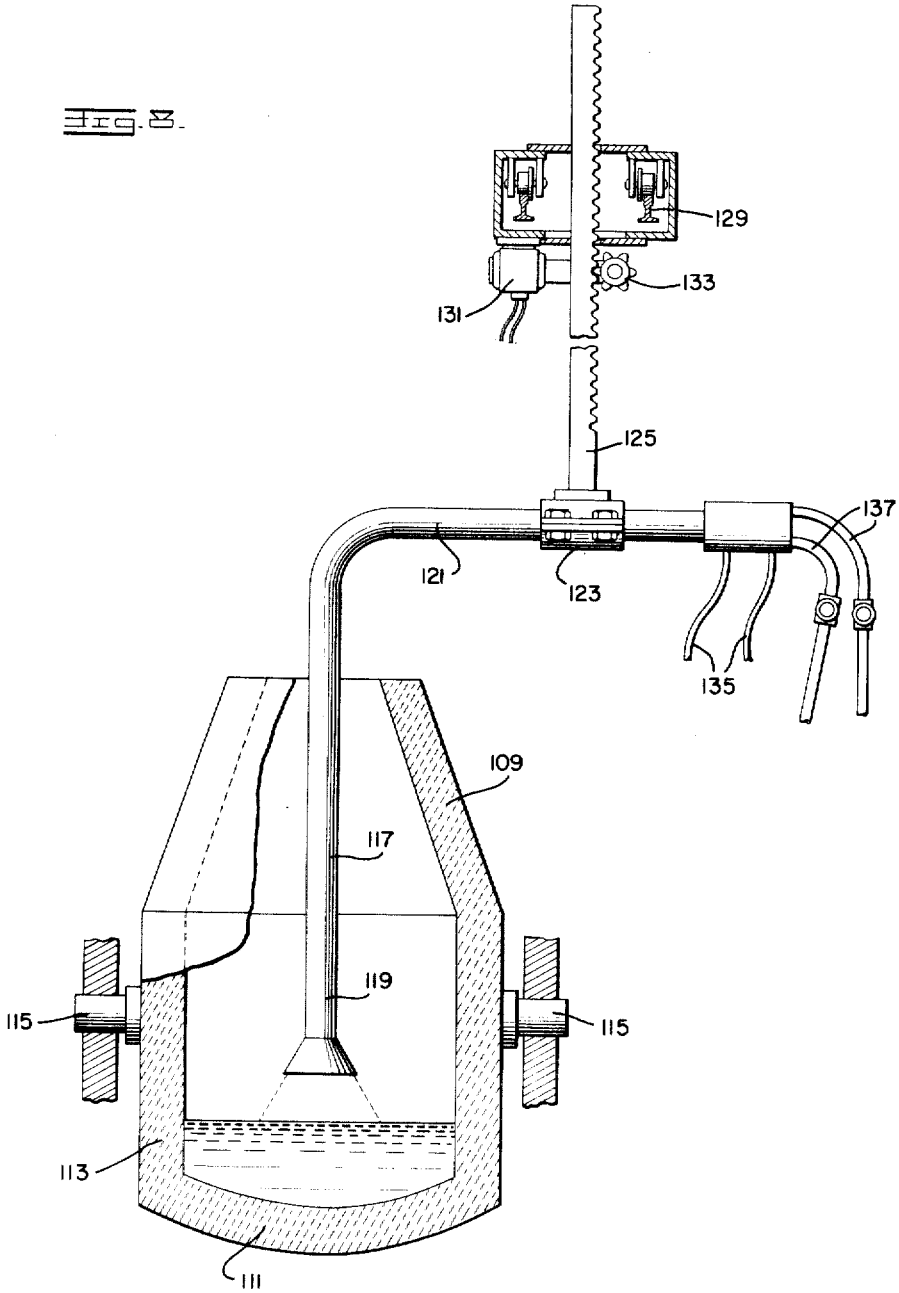
FIGURE 8 is a diagrammatic view, partly in section, of a furnace constructed in accordance with still another embodiment of the present invention.

A highly advantageous further embodiment of the invention is shown in FIGURE 8. As is there shown, a furnace is provided in the from of a converter 109, *upright crucible*, having downwardly dished bottom 111 and cylindical side walls 113 which terminate upward in a conically upwardly converging top. Side walls 113 carry diametrically opposed axially aligned trunnions 115 mounted for rotation in fixed supports so that converter 109 may be rocked about a horizontal axis.

Extending down into converter 109 and terminating only a short distance above the bath therein is an elongated jet device 117 having a vertically disposed end section 119 substantially within the converter and a horizontal base portion 121. Jet device 117 is carried by a sleeve 123 releasably clamped to base portion 121 so that upon loosening the sleeve, base portion 121 may rotate therein to enable the vertical section 119 to be withdrawn from the converter. Sleeve 123, in turn, is supported by a vertical rack bar 125 slidably mounted in a trolley that rolls on horizontal rails 129. A motor 131 is carried by the trolley and drives a pinion 133 in mesh with the rack teeth of rack bar 125 thereby to raise and lower rack bar 125 relative to the trolley so as to change the elevation of jet device 117.

Cooling fluid is supplied to jet device 117 through supply and return water lines 135, and the components of the combustible mixture are supplied to the jet device through fuel and oxygen lines 137, as in the previous embodiments.

In operation, after the converter of FIGURE 8 has been charged, it is necessary only to roll the trolley along rails 129 until section 119 of jet device 117 is directly over the mount of converter 109. Motor 131 is then actuated to lower the jet device to the desired elevation within the converter. If the converter has been charged with scrap or other solid charge, the lower end of section 119 will initially be higher than is shown in FIGURE 8[;] [and after] *After* the melting down period is completed, motor 131 will again be actuated to lower the jet device to the position of FIGURE 8 and then at least oxygen is flowed through the jet device 117 to effect the refining. If it is desired to pour off slag during the heat, the jet device is simply raised and the converter tilted to decant the slag. At the end of the heat, the jet device is raised and rolled away, whereupon the refined metal may be tapped from an upright converter or teemed from a tilted converter.

The application of the present invention to converters of the type shown in FIGURE 8 makes possible a great advance in the art of pyrometallurgy. Heretofore, the use of scrap in such converters had been limited for there had been no commercially practical way to supply the heat needed to enable the use of solid charge material such as scrap or ores or the like. By the present invention, however, there is provided a means both for supplying any portion of or the total heat requirements of the process even when a large quantity of scrap is used, and for supplying any portion of or the total atmosphere requirements of the process, regardless of the nature or configuration of the furnace. Thus, for the first time in a converter, it is possible to employ large proportions of solid charge materials and thereby obtain the most economical charge.

Figure 9:
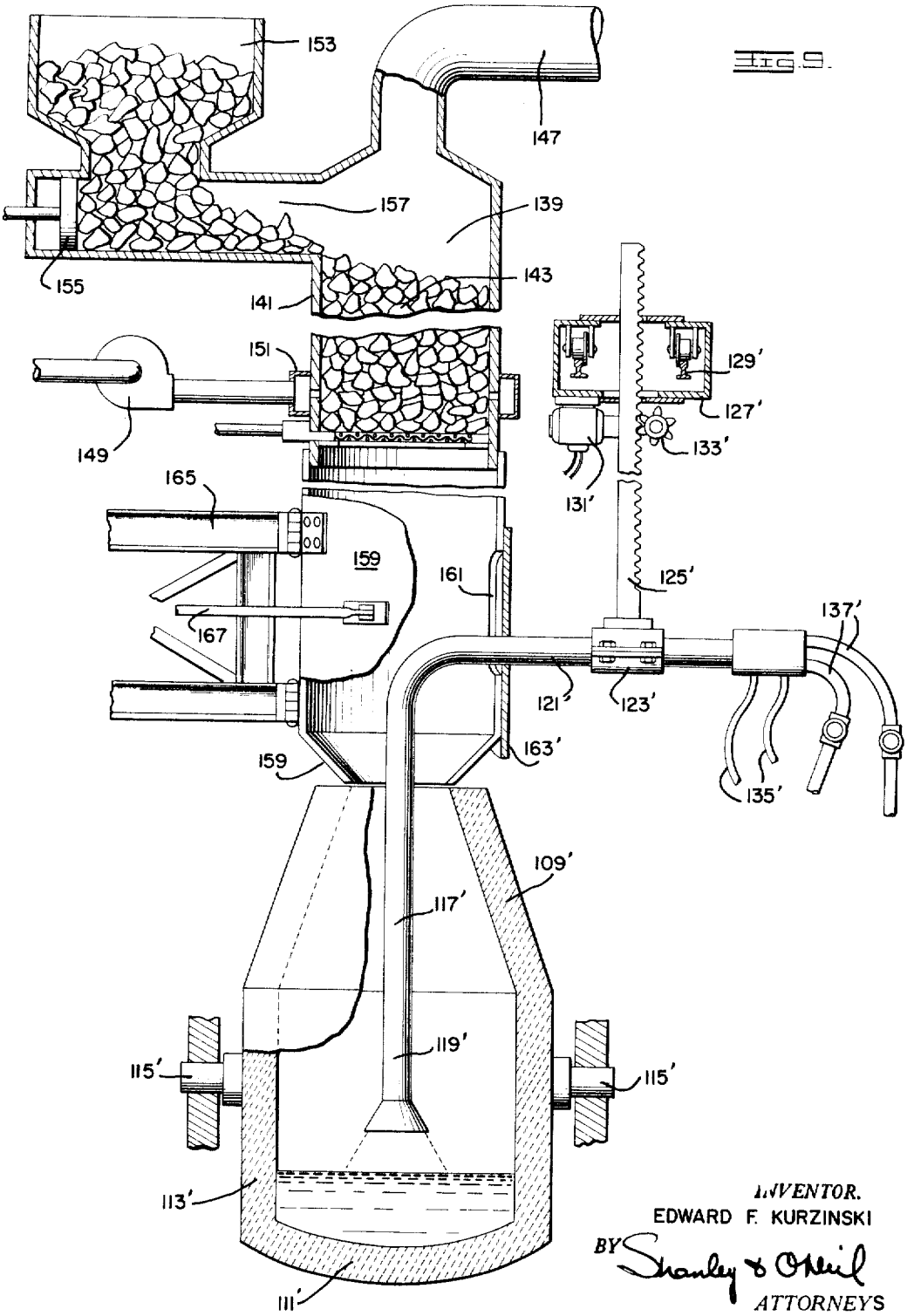
FIGURE 9 is a diagrammatic view, partly in section, of furnace apparatus constructed in accordance with further embodiments of the present invention.

It is desirable to recover some of what would otherwise be the lost heat values of the operation. A further embodiment of the invention, designed for this purpose, is shown in FIGURE 9. The modification of FIGURE 9 uses the same converter and jet device as in FIGURE 8, so that corresponding parts are indicated by primed reference numerals in FIGURE 9. In addition, in FIGURE 9, a preheat chamber 139 is provided which is vertically elongated and has cylindrical side walls 141 and carries a quantity of charge 143 just sufficient for the next heat, so that the waste gases from one heat preheat the solid charge for the next heat. The bottom of chamber 139 is closed by a horizontally slidable gas-permeable grating which may be withdrawn to let the charge fall into the furnace. The furnace gases thus pass through the grating and charge 143 and escape from the top of chamber 139 by way of discharge conduit 147, whence they may be used to preheat the oxygen and fuel or may be discharged to the atmosphere. In any event, by this means, the heat values of the exiting furnace gas are recovered.

As the gases escaping from the furnace may not be fully burned, further heat values are recovered from these gases by supplying air through a blower 149 to an annular bustle pipe 151 that surrounds the lower portion of side walls 141 and communicates with the interior of chamber 139 through holes through those side walls. The charge to chamber 139 is supplied by means of a hopper 153 which stores a quantity of solid charge such as scrap or ore or lime or limestone or the like. A discharge assistant is provided for the bottom of hopper 153, in the form of a horizontally reciprocable plunger 155 which advances material from the hopper through a discharge conduit 157 and thence into chamber 139. The angle of repose of the charge in discharge conduit 157 is such that charge material does not pass from hopper 153 to chamber 139 in the absence of movement of plunger 155.

In order to assure that a maximum proportion of the gases escaping from the furnace passes through the charge to preheat the charge, a removable adapted shield may be provided to form a confined gas passageway between converter 109' and chamber 139. This adapter includes a pair of opposed generally semi-cylindrical adapter halves 159 which have confronting contiguous vertical edges, the edges to the right of FIGURE 9 being recessed with confronting slots 161 to provide a vertical elongated opening in which jet device 117' may be moved. A shield 163 fixed to horizontal portion 121' of jet device 117' moves with the jet device and closes slots 161 in all positions of the jet device relative to the adapter. On the other side of adapter halves 159, to the left of FIGURE 9, there is shown the mounting for halves 159 by which they swing in clamshell relationship. Both halves 159 are mounted on vertically spaced axially aligned hinges carried at the outer ends of beams 165. An operating rod 167 individual to each half 159 and pivotally secured thereto enables conjoint opening or closing of halves 159.

Thus, when it is desired to remove jet device 117' from converter 109', it is necessary only to open halves 159 by manipulation of rods 167, raise the jet device by actuation of motor 131' in an appropriate direction, release sleeve 123' and move trolley 127' lengthwise of tracks 129' to slip the jet device out from under the fixed preheat chamber 139. For adjusting the elevation of the jet device with the adapter halves closed, as between various stages of a heat, it is necessary only to actuate motor 131' in the appropriate direction, whereupon the jet device moves vertically in slots 161.

Figure 10:
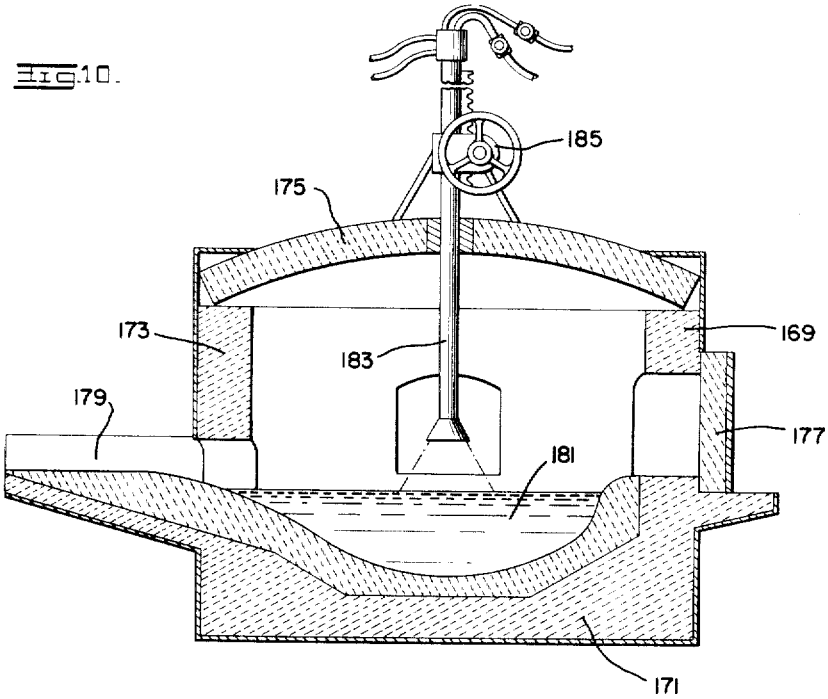
FIGURE 10 is a diagrammatic view, in section, of a furnace constructed in accordance with a still further embodiment of the present invention.
Figure 11:
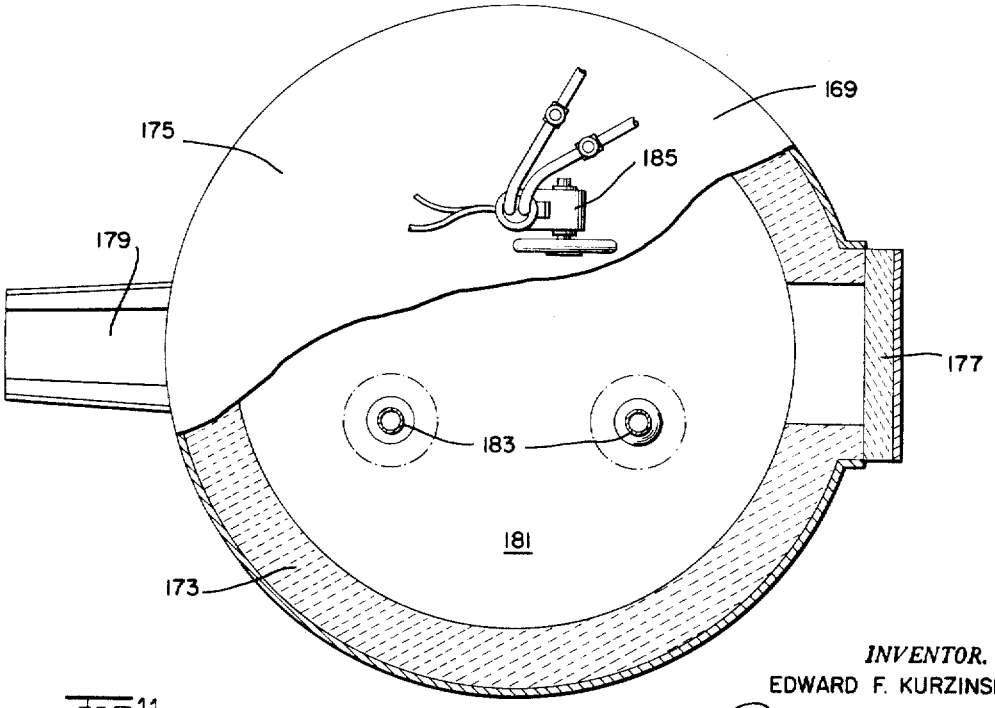
FIGURE 11 is a plan view, partly in section, of the apparatus of FIGURE 10.

Still another of the many forms of furnace in which the present invention may be practiced is the electric arc furnace. FIGURES 10 and 11 show a direct-arc electric furnace 169 modified according to the present invention. As is usual in such furnaces, the furnace structure includes a generally circular bottom 171, a cylindrical side wall 173 and a domed roof 175. Roof 175 may be removable for top charging, if desired, or charging may be effected through one or more charging doors 177. A tapping spout 179 is provided for discharging slag when the furnace is rocked on trunnions (not shown) about at horizontal axis, or for teeming the molten charge 181 into molds. Thus far, the structure of FIGURES 10 and 11 is merely conventional electric furnace structure.

Electric furnace structure is ordinarily further characterized by the provision of carbon or graphite electrodes extending through the roof; but in the present invention, one or more or all of these electrodes are replaced by oxy-fuel delivery devices as previously described or such oxy-fuel delivery device or devices may be added. Of course, if all the electrodes are replaced with jet devices, the furnace is no longer an electric arc furnace. Therefore, the embodiment of FIGURES 10 and 11 should be considered not so much as improvement in electric arc furnaces as a means for using existing electric furnace capacity for the practice of the present invention.

In accordance with the invention, the structure of FIGURES 10 and 11 differs from conventional electric furnace construction in that instead of electrodes, jet devices 183 extend through the roof through the electrode openings therein and into the furnace to a point a short distance above charge 181. Jet devices 183 are the same as jet devices 59 of FIGURE 4, and are mounted on roof 175 and are vertically adjustable relative to the charge in the furnace by means of mounting means 185 identical to the corresponding mounting means of FIGURE 4. In FIGURES 10 and 11, all three electrodes are shown replaced by jet devices, but it will also be understood that in furnaces having multiple electrodes, less than all the electrodes may be replaced.

The principles of the invention will be more fully understood from a consideration of the manipulative steps associated with an individual heat. For purposes of illustration, the example of an open hearth furnace used for steel production will be considered, it being expressly understood that substantially the same manipulative steps apply to the production of other refined metals from which substances other than or in addition to carbon are removed during refining.

Accordingly, in connection with the embodiment of FIGURES 1, 2 and 3, the furnace is charged with limestone, ore and scrap, and atomized fuel is fed to burner 19 in a conventional manner so as to produce a relatively large, low velocity, low temperature flame. After the scrap charge has begun, for example after about one-fourth of the scrap is charged, oxygen and fuel are fed through the jet device to within the furnace to form a relatively small high velocity high intensity flame at the discharge end of the jet device. This flame is disposed beneath the larger burner flame, and the burner flame, at substantially lower temperature, in effect insulates the roof from the jet flame, as described above. Using natural gas as the fuel and assuming for simplicity that natural gas consists of methane, the oxygen-fuel ratio is regulated to form a stoichiometric mixture of two parts of oxygen to one part of methane thereby to provide maximum heat input.

The jet device is moved so that its flame end is only a short distance from the solid charge; and with the flame playing at relatively high velocity and temperature directly on the charge within the confines of the contour of the charge, it is moved about the surfaces of the charge within the confines of the contour of the charge in such a manner as to melt the scrap within the shortest period of time. Movement of the jet device may be programmed by automatic control of the mechanism for imparting different movements to the jet device, or it may be moved under manual control at random according to the option of the operator. During this stage, the fuel-oxygen ratio is usually selected for nearly maximum heat input and for providing an oxidizing atmosphere in the furnace to oxidize scrap to the desired degree during the melt-down period. However, it is possible to vary this ratio so as to increase or decrease the oxidizing tendency of the mixture, or even to provide a *neutral or* reducing atmosphere, depending on the quality and makeup of the scrap in the furnace. Generally, fine scrap requires reducing oxy-fuel mixtures, while heavy scrap such as ingot butts or slabs requires more oxidizing oxy-fuel mixtures.

When the charge is fully liquid, the play of the relatively small, short, high velocity and high temperature flame on the now-liquid surface of the charge may be continued, with the jet tip only a short distance from the surface of the charge and the axis of the jet flame at an angle no less than about 25° to the surface of the bath and the high velocity flame parting the slag and directly contacting the molten metal, until the end of the refining period.

Upon hot metal addition, slag will form over the bath but its presence will not decrease heat transfer from the flame, since the momentum of the flame at the discharge end of the jet device is sufficient to blow the slag from the surface of the metal and allow the flame to impinge directly on the metal. Thus, development of a foamy slag presents no problem in practicing the present invention and there is no necessity, as in conventional operations, to cut back on the fuel input to the furnace until the foamy slag condition is corrected.

In those instances in which the jet device is mounted through an end or side wall, it is also advantageous to continue movement of the jet device throughout the period during which the charge is liquid, as this augments the natural circulation of the bath and further reduces the total time of the heat.

If maximum heating effect is required, oxygen and fuel together may be continuously fed through the jet device during the heat and on into the refining period. As the metal bath may require, the fuel may be decreased and finally cut off to feed oxygen alone through the jet device for the last stages of refining. Of course, as mentioned above, abnormal conditions may be corrected by altering the fuel-oxygen ratio from this predetermined pattern.

Thus, a further feature of the present invention is the possibility of utilizing oxy-fuel flame during the refining period of a heat such that the temperature and the reaction between oxygen and the impurity in the bath can be most effectively controlled. Thus, the refining period is in effect begun much earlier in the present invention than in processes employing a conventional oxygen jet such as a roof lance.

As the operations in which the present invention is useful are primarily methods for controlling oxidation reactions so as to remove metalloids and to apply proper heat input to metal baths, a very important feature of the present invention resides in the fact that this invention provides for the first time an instrumentality for performing both of these two functions. Thus, the present invention is characterized by apparatus which may be manipulated both to control heat input and to remove impurities, either sequentially or concurrently.

Further possibilities of the present invention involve the introduction of materials other than oxygen and fuel through the jet devices. For example, in the case of steel making, powdered lime or ore may be introduced in suspension in the oxygen stream.

The manipulative steps described above are also applicable to the embodiments of FIGURES 4, 8, 9 and 10, except of course that there is no burner flame apart from the flames issuing from the jet devices, and apart from the fact that the jet devices are not universally movable but rather are vertically adjustable along their axes. Thus, in the case of these latter embodiments, the jet devices will be used in relatively elevated positions during melting down or other initial stages of a heat, and will be used in relatively lowered positions during refining or other stages of the heat during which the charge is principally in liquid phase. In the case of the embodiments of FIGURES 8 and 9, in which the charge in hopper 153 is preferably of uniform composition and in which it is obviously desirable to avoid the introduction of charges of different compositions by means of chamber 139, the advantages of introducing a portion of the charge in solid phase in suspension in the gaseous material passing through the jet device will be particularly apparent, for in this way the composition of the charge may be varied according to the stage of the heat.

In the particular case of decarburization during steel making, when an oxygen is used, the reaction proceeds as follows:

$$2C+O_2 \rightarrow 2CO$$

However, with the flame of the present invention, considering, for example, methane to be the fuel, it is believed that the following reaction takes place:

$$CH_4+2O_2 - CO_2+2H_2O$$

and then, in the bath, the further reactions occur as follows:

$$CO_2+C - 2CO; \text{ and}$$
$$H_2O+C - CO+H_2$$

The foregoing reactions indicate that with pure oxygen, one mol of oxygen removes two mols of carbon while with an oxygen-methane flame, two mols of oxygen remove three mols of carbon. There is thus a considerable difference between the introduction of an oxygen jet for refining purposes and the practice of the present invention in which the fuel and the oxygen are admixed together and burned to produce a flame which is used to perform a portion of the refining operation. The flame of the present invention removes less carbon per mol of oxygen and hence gives a much less violent reaction than an oxygen jet. This oxy-fuel technique, by lowering the carbon reduction rate, substantially adds to the heat input to the bath without reducing carbon too rapidly, with the result that the temperature and carbon level in the bath can be more closely controlled. In any event, it is evident that by the practice of the present invention the total time per heat is greatly reduced. Moreover, comparable advantages are obtainable in the case of other metals containing other impurities to be removed during refining.

As mentioned above, it is also contemplated by the present invention to adjust the oxygen-fuel ratio of the oxygen and fuel fed to the furnace through the confined path provided by the jet device in order to control the atmosphere and temperature of the furnace in such a manner as to meet specific requirements during various stages of a heat. For example, when the application of maximum heat is desired the oxygen-fuel ratio is adjusted to provide a stoichiometric mixture, while if maximum heat is not required the ratio is adjusted to provide an abundance of oxygen or fuel depending upon whether an oxidizing or non-oxidizing atmosphere is desired. Where the oxygen-fuel ratio does not provide a stoichiometric mixture, the extent the ratio departs from a stoichiometric mixture, whether there is an excess of oxygen or fuel, will depend upon specific furnace requirements.

It has been determined that the ratio of oxygen to fuel may be maintained in a range of about 0.7 of a stoichiometric mixture to about 1.8 of the stoichiometric mixture and provided the necessary control of temperature and atmosphere during the stages of an open hearth process when fuel is required through the jet device. The range of oxygen ratios to one part of fuel for various fuels in accordance with this formula are as follows:

| Type of fuel: | Range of oxygen ratios (by volume) |
|---|---|
| Natural gas | 1.3–3.0 |
| Propane | 3.5–9.0 |
| City gas | 0.35–0.9 |
| Oil (Bunker C), cu. ft./gal. | 300–450 |

For each fuel, *combustible gas or hydrocarbon oil,* the oxygen ratio providing a stoichiometric mixture will comprise the preferred ratio when maximum heat is desired.

The present invention may be practiced by employing pure oxygen or impure oxygen within limits which may be determined at least in part by the quantity of heat the charge may adsorb and by the amount of nitrogen that may intimately contact the bath without adversely affecting desired characteristics of the product. In general, oxygen of a purity above 50% may be employed. The purity of the oxygen may be varied throughout the process with, for example, oxygen of low purity being employed during initial phases of the process when the charge is relatively cold and oxygen of high purity being used during refining especially when oxygen alone is introduced through the confined path.

As mentioned above the discharge end of the oxy-fuel burner may be provided with a plurality of discharge nozzles positioned about and disposed downwardly and outwardly relative to the longitudinal axis of the oxy-fuel burner. This type of discharge end produces a plurality of flames that impinge upon a substantially circular area located below the oxy-fuel burner and substantially concentric with its longitudinal axis. In some application of single or multiple oxy-fuel burners mounted in the roof of conventional open hearth furnaces or modified open hearth type furnaces according to the present invention, it may be desirable to employ oxy-fuel burners having discharge ends designed to provide a plurality of flames that will impinge upon a non-circular area in order to apply heat directly to a greater area of the charge without damage to the side walls. This may be accomplished by positioning the discharge nozzles on the opposite sides of the burner which face the side walls of the furnace at a less angle than the other nozzles which generally face the end walls of the furnace. Also, the discharge end may be constructed so that the discharge opening of the nozzles lie in any desired path.

If desired the oxy-fuel burners may be used in combination with oxygen lances or the oxy-fuel burners may be provided with a separate passageway for oxygen to provide for simultaneous heating and refining.

Moreover, the concept of feeding the total feed through the oxy-fuel burners may be employed in conventional furnaces with the fuel input being as high as permitted by the existing exhaust system.

From a consideration of the foregoing, it will be obvious that all of the initially recited objects of the present invention have been achieved.

It is to be understood that the appended claims are to be accorded a range of equivalents commensurate in scope with the advance made over the prior art.

What is claimed is:

1. The method of operating a metallurgical furnace of the open hearth type having a bottom, a roof and side walls defining a zone and having end wall burners, comprising the steps of operating the end wall burners and introducing fluid including fuel and oxygen along at least one confined path downwardly to within the zone, burning the fuel and oxygen in admixture to form a short flame beyond the end of the confined path, charging solid material including metal into the zone, operating the end wall burners and separately burning the admixture to form a short flame while charging the solid material while moving the end of the confined path to direct the short flame onto solid material beneath the confined path, adding hot molten metal to the zone upon the completion of the charging of solid material, and thereafter continuing the introduction of at least oxygen through the confined path and directing the resulting stream onto the molten metal to refine the metal of the charge.

2. The process of producing steel comprising charging a furnace with solid ferrous metal, [mixing in] *feeding through* a lance a fluid fuel and substantially pure oxygen, causing the lance to direct an oxygen fluid fuel flame downwardly upon the solid ferrous metal from a location above the solid ferrous metal while solid ferrous metal is being charged, melting a substantial portion of the solid ferrous metal by the fluid fuel oxygen flame emitted by the lance, [shutting the] *reducing the flow of* fluid fuel [off] from the lance while continuing the flow of oxygen during refining, lowering the lance to a position such that the oxygen flow is discharged during at least a portion of the refining period in the immediate vicinity of the metal bath surface and permitting the oxygen flow from the lance to lower the carbon content of the bath.

3. The process of producing steel in an open hearth furnace comprising charging the furnace with solid ferrous metal, mixing in a lance a fluid fuel and substantially pure oxygen, causing the lance to direct an oxygen fluid fuel flame downwardly upon the solid ferrous metal from a location above the solid ferrous metal while solid ferrous metal is being charged, melting a substantial portion of the solid ferrous metal by the fluid fuel oxygen flame emitted by the lance, charging molten iron into the furnace, shutting the fluid fuel off from the lance while continuing the flow of oxygen, lowering the lance to a position such that the oxygen flow is discharged in the immediate vicinity of the metal bath surface, permitting the oxygen flow from the lance to lower the carbon content of the bath during a refining period, and controlling the temperature of the bath during said refining period by the addition to the bath of solid ferrous metal.

4. The process of producing steel in [an open hearth] *a* furnace comprising charging the furnace with solid ferrous metal, [mixing in] *feeding through* a lance a gaseous fuel and substantially pure oxygen, causing the lance to direct an oxygen fuel flame downwardly upon the solid ferrous metal from a location above the solid ferrous metal while the solid ferrous metal is being charged, melting a substantial portion of the solid ferrous metal by the oxygen fuel flame emitted by the lance, charging molten iron into the furnace, [shutting the] *reducing the flow of* gaseous fuel [off] from the lance while continuing the flow of oxygen [lowering the lance to a position] such that the oxygen flow is discharged in the immediate vicinity of the metal bath surface and permitting the oxygen flow from the lance to lower the carbon content of the bath.

5. The process of producing steel in an open hearth furnace comprising charging the furnace with solid ferrous metal and lime, mixing in a lance a fluid fuel and substantially pure oxygen, causing the lance to direct an oxygen fluid fuel flame downwardly upon the solid ferrous metal from a location above the solid ferrous metal while the solid ferrous metal is being charged, melting a substantial portion of the solid ferrous metal by the fluid fuel oxygen flame emitted by the lance, charging molten iron into the furnace, reducing the flow of fluid fuel from the lance while continuing the flow of oxygen, lowering the lance to a position such that the oxygen flow is discharged in the immediate vicinity of the metal bath surface and permitting the oxygen flow from the lance to lower the carbon content of the bath.

6. The process of producing steel in an open hearth type furnace having [end wall] *conventional end wall* burners, comprising charging the furnace with solid ferrous metal, operating the [end wall] *conventional end wall* burners, feeding through a lance a fluid fuel and substantially pure oxygen, causing the lance to direct an oxygen fluid fuel flame downwardly upon the solid ferrous metal from a location above the solid ferrous metal while the solid ferrous metal is being charged, melting a substantial portion of the solid ferrous metal by said [end wall] *conventional end wall* burners and the fluid fuel oxygen flame emitted by the lance, charging molten iron into the furnace, reducing the flow of fluid fuel from the lance while continuing the flow of oxygen, lowering the lance to a position such that the oxygen flow is discharged in the immediate vicinity of the metal bath surface and permitting the oxygen flow from the lance to lower the carbon content of the bath.

7. The method of operating a metallurgical furnace of the open hearth type having a bottom, a roof and walls defining a zone and having end wall burners, comprising the steps of operating the end wall burners and introducing fluid including fuel and oxygen along at least one confined path downwardly to within the zone, burning the fuel and oxygen in admixture to form a short flame beyond the end of the confined path, charging solid material including metal into the zone, operating the end wall burners and separately burning the admixture to form a short flame while charging the solid material, moving the end of the confined path to direct the short flame onto solid material beneath the confined path, adding hot molten metal to the zone upon completion of the charging of solid material, and thereafter continuing the introduction of at least oxygen through the confined path and directing the resulting stream onto the molten bath to refine the metal of the charge.

8. The method of operating a metallurgical furnace of the open hearth type having a bottom, a roof and walls defining a zone and having [end wall] *conventional end wall* burners, comprising the steps of operating the [end wall] *conventional end wall* burners and introducing fluid including fuel and oxygen along at least one confined path downwardly to within the zone, burning the fuel and oxygen in admixture to form a short flame beyond the end of the confined path, charging solid material including metal into the zone, operating the [end wall burners and] *conventional end wall burners,* separately burning the admixture to form a short flame while charging the solid material, moving the end of the confined path to direct the short flame *which flame is directed* onto solid material beneath the confined path and thereafter continuing the introduction of at least oxygen through the confined path and directing the resulting stream onto the molten bath to [refine] *heat* the metal of the charge.

9. The process of producing steel comprising charging a furnace with solid ferrous metal, mixing in a lance a fluid fuel and substantially pure oxygen, causing the lance to direct an oxygen fluid fuel flame downwardly upon the solid ferrous metal from a location above the solid ferrous metal to cause rapid melting of the solid ferrous metal, melting a substantial portion of the solid ferrous metal by the fluid fuel oxygen flame emitted by the lance, reducing the flow of fluid fuel from the lance while continuing the flow of oxygen during refining of the molten metal, lowering the lance to a position such that the oxygen flow is discharged during the refining period in the immediate vicinity of the molten metal bath surface, thereby lowering the carbon content of the bath and adding to the molten bath solid ferruginous material during said refining period.

10. The process of producing steel in [an open hearth] *a* furnace comprising charging the furnace with solid ferrous metal, mixing in a lance a fluid fuel and substantially pure oxygen, causing the lance to direct an oxygen fluid fuel flame downwardly upon the solid ferrous metal from a location above the solid ferrous metal to cause rapid melting of the solid ferrous metal, melting a substantial portion of the solid ferrous metal by the fluid fuel oxygen flame emitted by the lance, reducing the flow of fluid fuel from the lance while continuing the flow of oxygen, lowering the lance to a position such that the oxygen flow is discharged in the immediate vicinity of the metal bath surface and thereby lowering the carbon content of the bath.

11. The process of producing steel in an open hearth furance comprising the charging of the furnace with solid ferrous metal, mixing a fluid fuel and substantially pure oxygen, directing an oxygen fluid fuel flame resulting from said mixture through at least one lance downwardly upon the solid ferrous metal from a location above the solid ferrous metal to cause rapid melting of the solid ferrous metal, melting a substantial portion of the solid ferrous metal by the fluid fuel oxygen flame emitted by the lance, charging molten iron into the furnace, reducing the flow of fluid fuel from the lance while continuing the flow of oxygen, lowering the lance to a position such that the oxygen flow is discharged in the immediate vicinity of the metal bath surface and thereby lowering the carbon content of the bath.

12. The proces of producing steel in [an open] [hearth] *a* furnace comprising charging the furnace with solid ferrous metal, mixing in a lance a fluid fuel and substantially pure oxygen, causing the lance to direct an oxygen fluid fuel flame downwardly upon the solid ferrous metal from a location above the solid ferrous metal while solid ferrous metal is being charged, melting a substantial portion of the solid ferrous metal by the fluid fuel oxygen flame emitted by the lance, charging molten iron into the furnace, shutting the fluid fuel off from the lance while continuing the flow of oxygen, lowering the lance to a position such that the oxygen flow is discharged in the immediate vicinity of the metal bath surface and thereby lowering the carbon content of the bath.

13. The process of producing steel in an open hearth furnace comprising charging the furnace with solid ferrous metal, mixing in a lance a fluid fuel and substantially pure oxygen, causing the lance to direct an oxygen fluid fuel flame downwardly upon the solid ferrous metal from a location above the solid ferrous metal to cause rapid melting of the solid ferrous metal, melting a substantial portion of the solid ferrous metal by the fluid fuel oxygen flame emitted by the lance, charging molten iron into the furnace, reducing the flow of fluid fuel from the lance while continuing the flow of oxygen, lowering the lance to a position such that oxygen is discharged in the immediate vicinity of the metal bath surface during a refining period thereby lowering the carbon content of the molten bath and controlling the temperature of the molten bath during said refining period by the addition to the bath of solid ferruginous material.

14. The process of producing steel in an open hearth furnace comprising charging the furnace with solid ferrous metal, mixing in a lance a fluid fuel and substantially pure oxygen, causing the lance to direct an oxygen fluid fuel flame downwardly upon the solid ferrous metal from a location above the solid ferrous metal to cause rapid melting of the solid ferrous metal, melting a substantial portion of the solid ferrous metal by the fluid fuel oxygen flame emitted by the lance, charging molten iron into the furnace, reducing the flow of fluid fuel from the lance while continuing the flow of oxygen, lowering the lance to a position such that the oxygen flow is discharged in the immediate vicinity of the molten metal bath surface during a refining period thereby lowering the carbon content of the bath and controlling the temperature of the bath during such refining period by the addition to the bath of solid iron oxide.

15. A method of operating a metallurgical furnace comprising the steps of charging the furnace, introducing fluid including fuel and oxygen along each of at least one confined path within the furnace, burning the fuel and oxygen in admixture to form a short, relatively high temperature flame beyond the confined path which impinges on the charged material and increasing the oxygen-fuel ratio of the mixture during a refining period thereby lowering the carbon content of the material in the furnace.

16. A method of operating a metallurgical furnace, comprising the steps of establishing in the furnace a metallic charge, introducing both fuel and oxygen along each of at least one confined path within the furnace to a point directly above the charge and spaced from the walls of the furnace and spaced only a short distance from the charge, burning the fuel and oxygen in admixture to form a short, relatively high temperature flame beyond the confined path, directing the flame downward onto the charge with the flame directly contacting the charge, and excluding air from continuous entry into the furnace to confine entry of gases into the furnace to substantially the gases entering the furnace along said at least one confined path.

17. A method of operating a metallurgical furnace, comprising the steps of establishing in the furnace metallic charge, introducing both fuel and oxygen along each of at least one confined path within the furnace to a point directly above the charge and spaced from the walls of the furnace and spaced only a short distance from the charge, burning the fuel and oxygen in admixture to form a short, relatively high temperature flame beyond the confined path, directing the flame downward onto the charge with the flame directly contacting the charge, and substantially excluding nitrogen from the furnace atmosphere.

18. A method of operating a metallurgical furnace, comprising the steps of establishing in the furnace a metallic charge, establishing in the furnace a first flame, introducing fuel and oxygen along at least one confined path within the furnace to a point directly above the charge and spaced from the walls of the furnace and spaced only a short distance from the charge, burning the fuel and oxygen in admixture to form a second flame beyond the confined path, the second flame being substantially shorter and hotter than the first flame, and directing the second flame downward onto the charge with the second flame directly contacting the charge [and disposed beneath the first flame].

19. A method of making steel in an open hearth furnace which comprises establishing a charge of ferrous material in the furnace, directing a first flame from [an] *a conventional* end wall burner into the furnace, introducing fuel and oxygen along at least one confined path within the furnace to a point directly above the charge and spaced from the walls of the furnace and spaced a substantial distance beyond the [end wall] *conventional end wall* burner and spaced *between two and four feet* [only a short distance] from the charge, burning the fuel and oxygen in admixture to form a second flame beyond the confined path substantially shorter than the first flame and of a temperature substantially higher than the first flame, and directing the second flame downward onto the charge with the second flame directly contacting the charge [and disposed beneath the first flame].

*20. A method of operating a metallurgical furnace comprising the steps of charging the furnace, introducing fluid including fuel and oxygen within the furnace along at least one confined path, the discharge end of said path being between two and four feet above the charge in the furnace, burning the fuel and oxygen in admixture to form a short, relatively high temperature flame beyond the confined path which impinges on the charged material and thereafter lowering the confined path and increasing the oxygen to fuel ratio of the mixture.*

*21. A method of operating a metallurgical furnace comprising the steps of charging the furnace, introducing fluid including fuel and oxygen within the furnace along at least one confined path, the discharge end of said path being located between two and four feet above the charge in the furnace, burning the fuel and oxygen in admixture to form a short, relatively high temperature flame beyond the confined path which impinges on the charged material and thereafter introducing at least oxygen into the furnace at a distance of between four and six inches above the resulting furnace bath.*

*22. A process for the production of steel from charging materials containing impurities, at least part of said charging materials being solid, comprising charging said solid charging materials into an upright crucible provided with a vertical blowing lance adapted to be lifted and lowered and having connections to an oxygen supply and to a fuel supply so that it is capable of operating selectively as a burner lance and as an oxygen blowing lance; directing a flame of fuel and oxygen from said lance operating as a burner lance against said solid charging materials from a distance between two and four feet above said materials so as to heat them and liquefy them; continuing liquefying and heating said charging materials to provide refining conditions; shutting off the fuel supply; and refining said charge in said crucible with said lance in a lowered position operating as an oxygen blowing lance to remove said impurities contained in said charging materials.*

*23. A process for the production of steel from charging materials comprising pig iron containing impurities and scrap, at least part of said charging materials being solid, comprising charging said solid charging materials into an upright tiltable crucible provided with a vertical blowing lance capable of altitude adjustment and having connections to an oxygen supply and to a fuel supply so that it is capable of operating temporarily as a burner lance and as an oxygen blowing lance; directing a flame from said lance operating as a burner lance against said solid charging materials from a distance between two and four feet above said materials so as to heat and liquefy the charging materials; continuing heating until the main portion of said solid charging materials is melted; adding liquid pig iron and further continuing heating until refining conditions are provided; and thereafter refining the charge after having shut off the fuel supply with said lance in a lowered position operating as an oxygen blowing lance to remove the impurities contained in said pig iron.*

*24. The method of claim 16, wherein the discharge end of the confined path is located between two and four feet above the charged material and is thereafter lowered to refine the resulting molten charge.*

*25. The method of claim 17, wherein the discharge end of the confined path is located between two and four feet above the charged material and is thereafter lowered to refine the resulting molten charge.*

*26. The method of claim 18, wherein additional metallic charge is added to the furnace and at least the second flame is adjusted to impinge directly on the added metallic charge.*

*27. The method of claim 20, wehrein the discharge end of the confined path is lowered to between four and six inches above the resulting furnace bath.*

References Cited

The following references, cited by the Examiner, are of record in the patented file of this patent or the original patent.

UNITED STATES PATENTS

| | | | |
|---|---|---|---|
| 1,140,550 | 5/1915 | Weissenburger | 75—60 |
| 2,818,247 | 12/1957 | Francis | 75—60 X |
| 2,820,706 | 1/1958 | Larsen | 75—60 X |
| 2,515,631 | 7/1950 | Chiswik | 266—34 |
| 2,878,115 | 3/1959 | Schane et al. | 75—60 X |
| 3,129,930 | 4/1964 | Labat-Camy | 75—60 X |
| 3,232,748 | 2/1966 | Rinesch | 75—60 |
| 723,501 | 3/1903 | Thofenhrn | 75—34 X |
| 2,039,087 | 4/1936 | Kinzel | 75—43 |
| 2,671,724 | 3/1954 | Kompart | 75—65 X |
| 2,741,555 | 4/1956 | Cuscoleca et al. | 75—60 X |

FOREIGN PATENTS

| | | |
|---|---|---|
| 638,886 | 6/1950 | Great Britain. |
| 642,084 | 8/1950 | Great Britain. |
| 847,848 | 9/1960 | Great Britain. |
| 266,009 | 12/1959 | Australia. |
| 1,166,807 | 6/1958 | France. |

(References on following page)

OTHER REFERENCES

"The Making, Shaping, and Treating of Steel," U.S. Steel, 7th ed., 1957, p. 330.

"J. of the Iron and Steel Inst.," vol. 189, May 1958, pp. 22–26.

Foundry, October 1947 (pp. 74–77, 221–226).

The Making, Shaping, and Treating of Steel, 7th edition, published by United States Steel Corporation, Pittsburgh, Pa., 1957, pp. 284–286, 308–313, 321–332.

Modern Castings, July 1960, pp. 84–86.

Steel, June 23, 1947 (pp. 107, 108, 144, 146), and June 30, 1947 (pp. 86–88, 90, 92).

DAVID L. RECK, *Primary Examiner.*

H. W. TARRING, *Assistant Examiner.*